(12) United States Patent
Rajasingham

(10) Patent No.: US 7,148,594 B2
(45) Date of Patent: Dec. 12, 2006

(54) AXIAL GAP ELECTRICAL MACHINE

(75) Inventor: Arjuna Indraeswaran Rajasingham, Bethesda, MD (US)

(73) Assignee: Millennium Motor Company

( * ) Notice: Subject to any disclaimer, the term of this patent is extended or adjusted under 35 U.S.C. 154(b) by 0 days.

(21) Appl. No.: 10/364,640

(22) Filed: Feb. 12, 2003

(65) Prior Publication Data

US 2003/0132045 A1 Jul. 17, 2003

Related U.S. Application Data

(63) Continuation-in-part of application No. 09/971,035, filed on Oct. 5, 2001.

(60) Provisional application No. 60/307,148, filed on Jul. 24, 2001, provisional application No. 60/293,388, filed on May 24, 2001.

(51) Int. Cl.
*H02K 7/02* (2006.01)

(52) U.S. Cl. .............. 310/75 C; 310/103; 180/65.5

(58) Field of Classification Search ............ 310/67 R, 310/90, 92, 78, 103, 104, 108, 109, 75 C, 310/75 R, 76, 80, 96–101, 102 R, 102 A; 180/65.5, 65.1, 65.2, 65.6

See application file for complete search history.

(56) References Cited

U.S. PATENT DOCUMENTS

| | | | | |
|---|---|---|---|---|
| 680,804 A * | 8/1901 | Newman et al. .......... 310/67 R |
| 2,899,005 A * | 8/1959 | Speicher .................... 180/10 |
| 3,617,762 A * | 11/1971 | Price et al. ................. 290/46 |
| 4,346,777 A * | 8/1982 | Restelli ..................... 180/220 |
| 5,272,938 A * | 12/1993 | Hsu et al. .................. 74/594.1 |
| 5,450,915 A * | 9/1995 | Li ............................. 180/65.5 |
| 5,465,802 A * | 11/1995 | Yang ......................... 180/65.5 |
| 5,581,136 A * | 12/1996 | Li ............................. 310/67 R |
| 5,744,896 A * | 4/1998 | Kessinger et al. .......... 310/268 |
| 5,818,134 A * | 10/1998 | Yang et al. .................. 310/78 |
| 6,046,518 A * | 4/2000 | Williams ..................... 310/43 |
| 6,100,615 A * | 8/2000 | Birkestrand ................ 310/75 C |
| 6,137,203 A * | 10/2000 | Jermakian et al. .......... 310/191 |
| 6,140,734 A * | 10/2000 | Hazelton et al. ............ 310/198 |
| 6,172,442 B1 * | 1/2001 | Jun ............................ 310/268 |
| 6,181,048 B1 * | 1/2001 | Smith et al. ................ 310/261 |
| 6,278,216 B1 * | 8/2001 | Li ............................. 310/254 |
| 6,321,863 B1 * | 11/2001 | Vanjani ..................... 180/65.5 |
| 6,355,996 B1 * | 3/2002 | Birkestrand ................. 310/54 |

\* cited by examiner

*Primary Examiner*—Dang Le

(57) ABSTRACT

An axial gap electrical machine employs unique architecture to (1) overcome critical limits in the air gap at high speeds, while maintaining high torque performance at low speeds, while synergistically providing a geometry that withstands meets critical force concentration within these machines, (2) provides arrangements for cooling said machines using either a Pelletier effect or air fins, (3) "windings" that are produced as ribbon or stampings or laminates, that may be in some cases be arranged to optimize conductor and magnetic core density within the machine. Arrangements are also proposed for mounting the machines as wheels of a vehicle, to provide ease of removing and installing said motor.

14 Claims, 33 Drawing Sheets

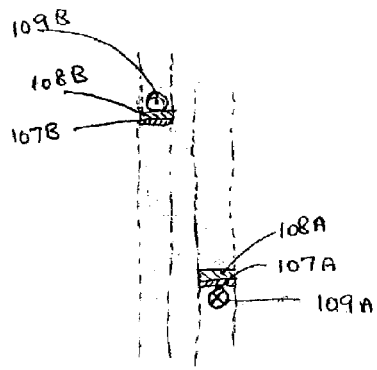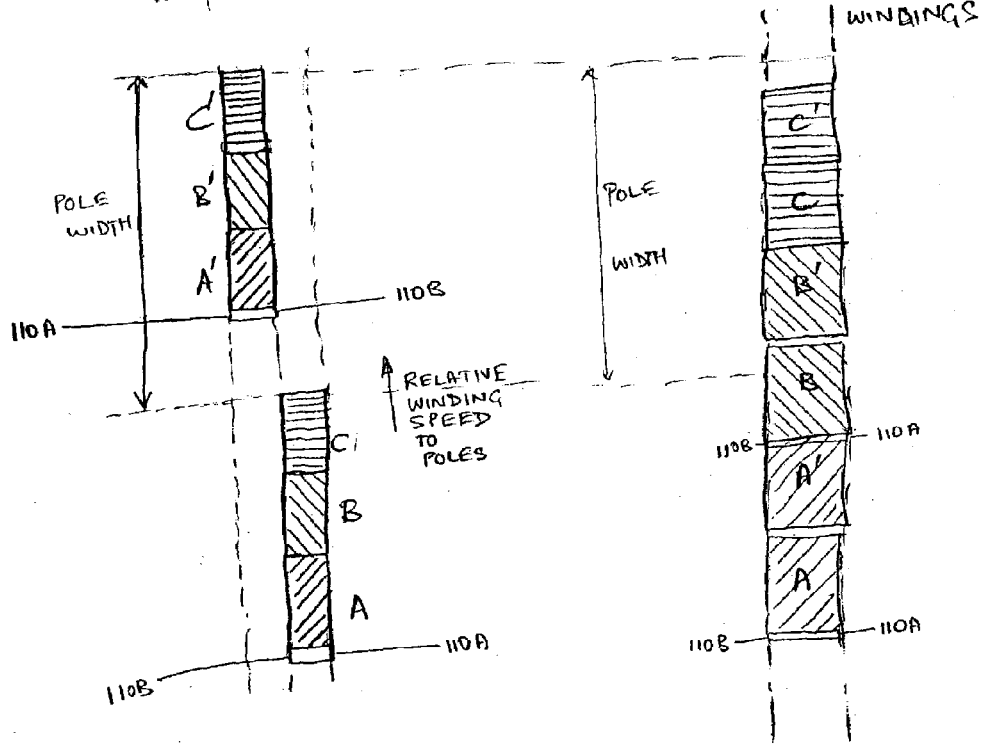

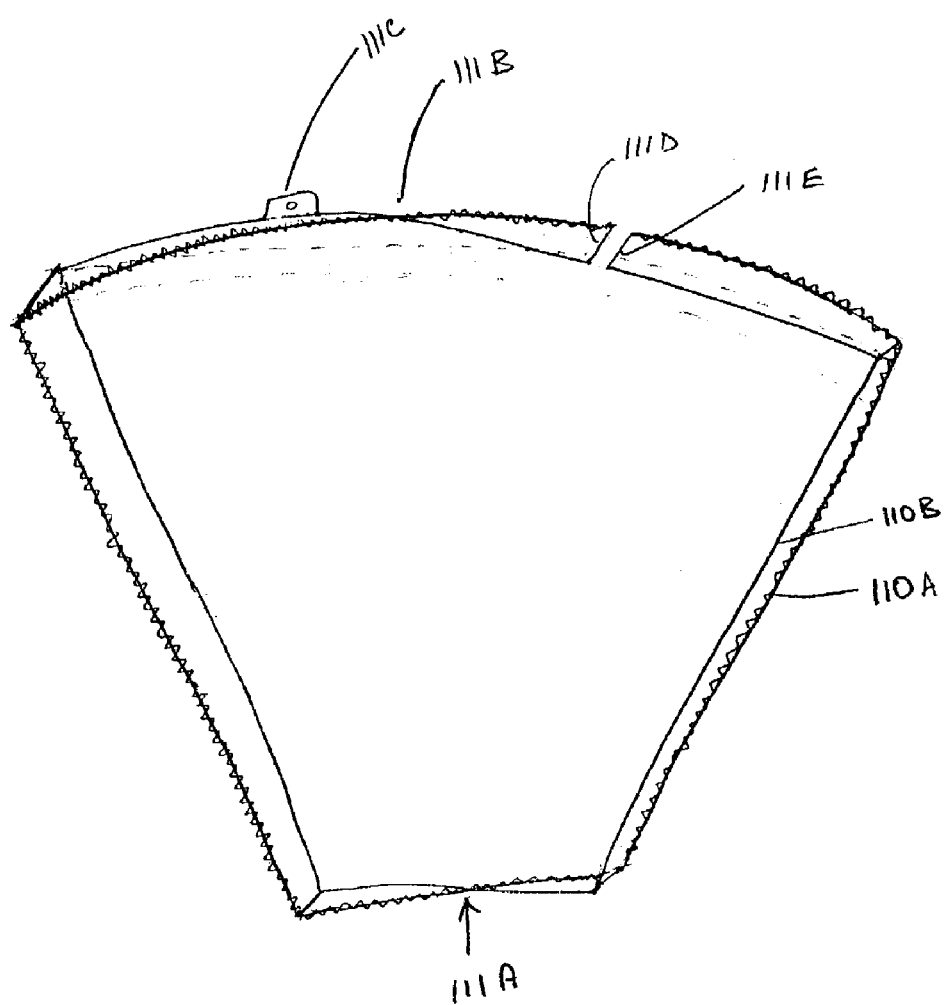
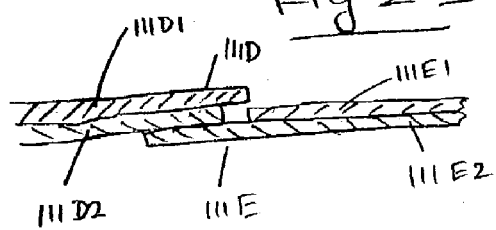

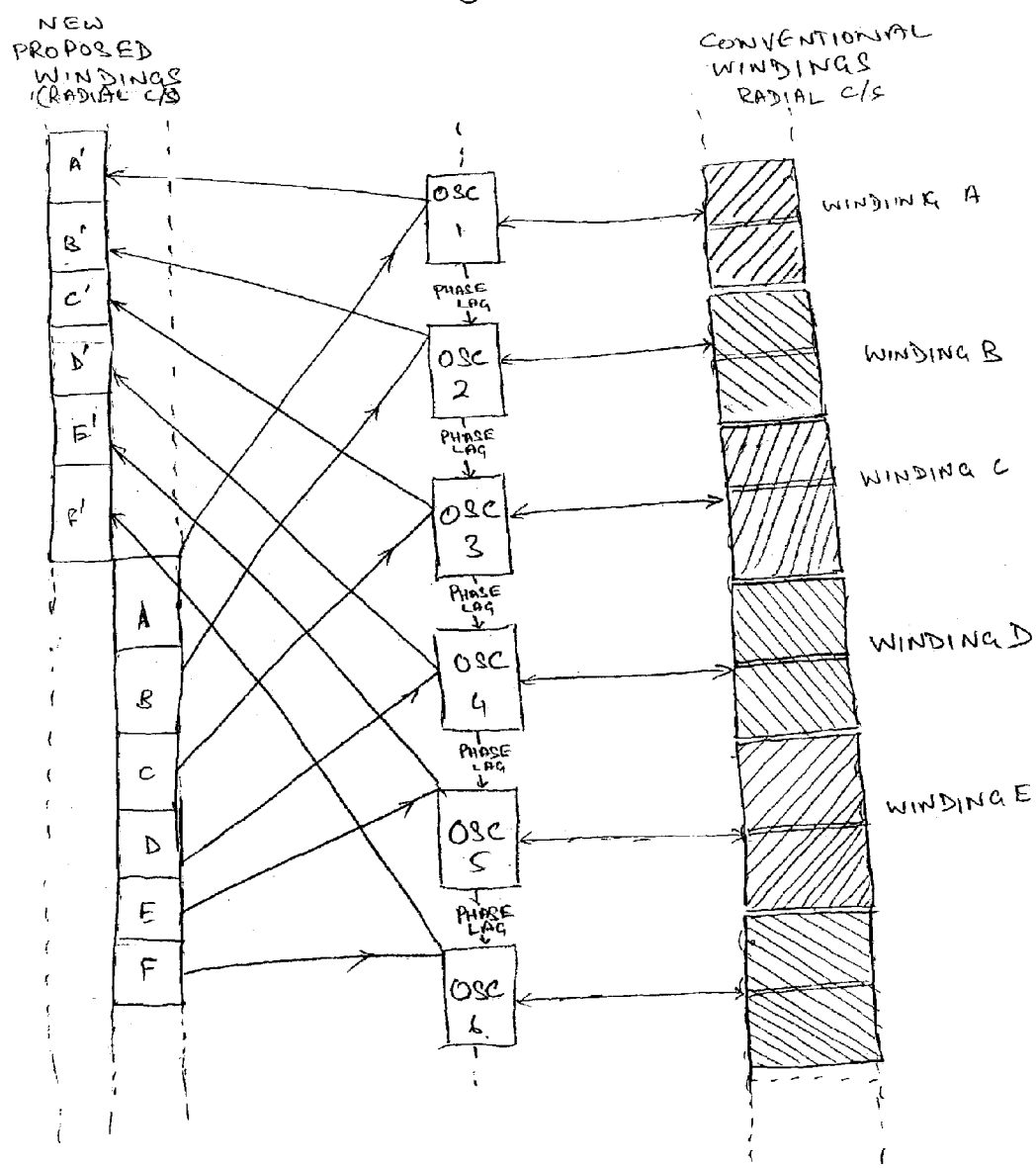

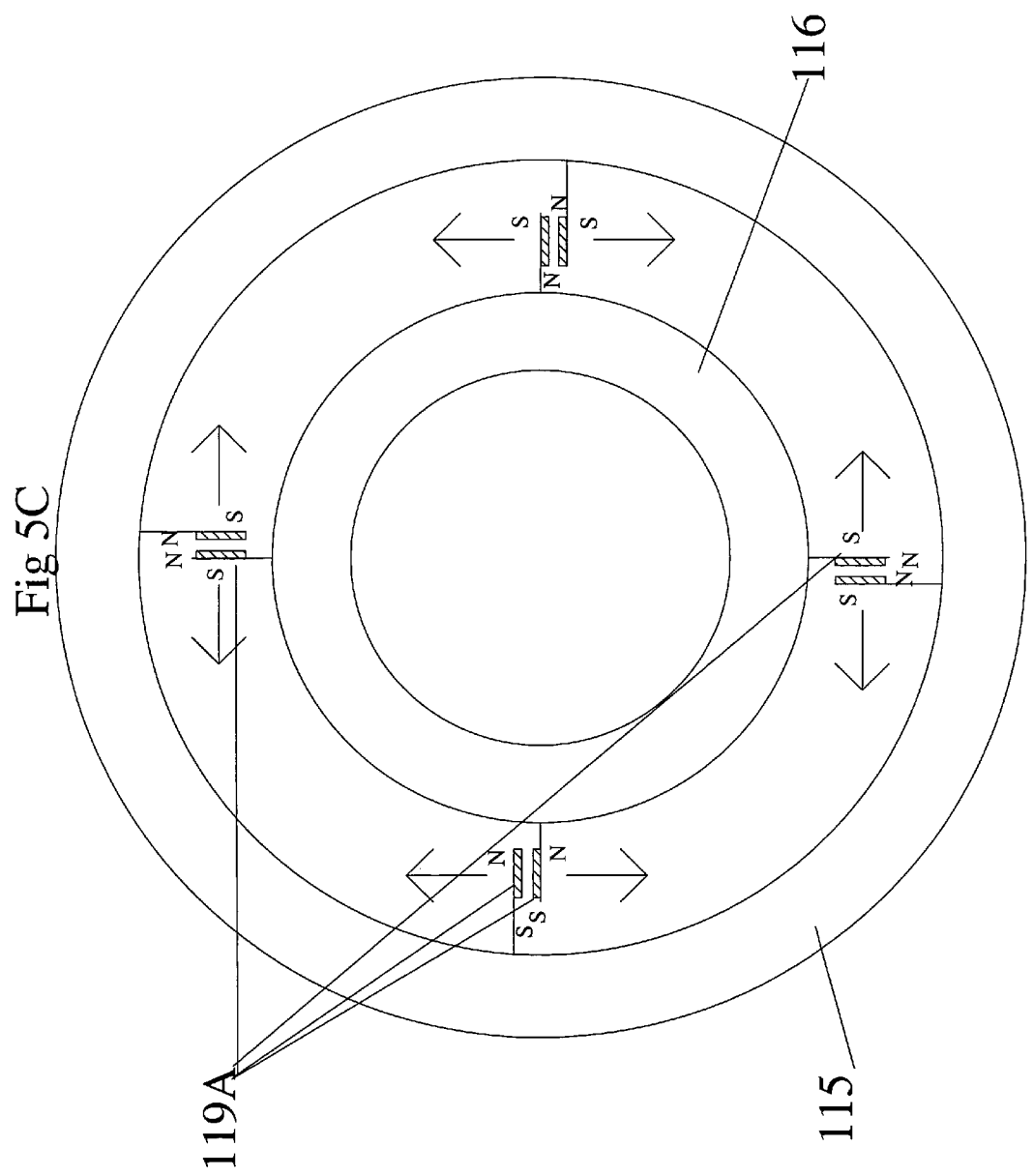

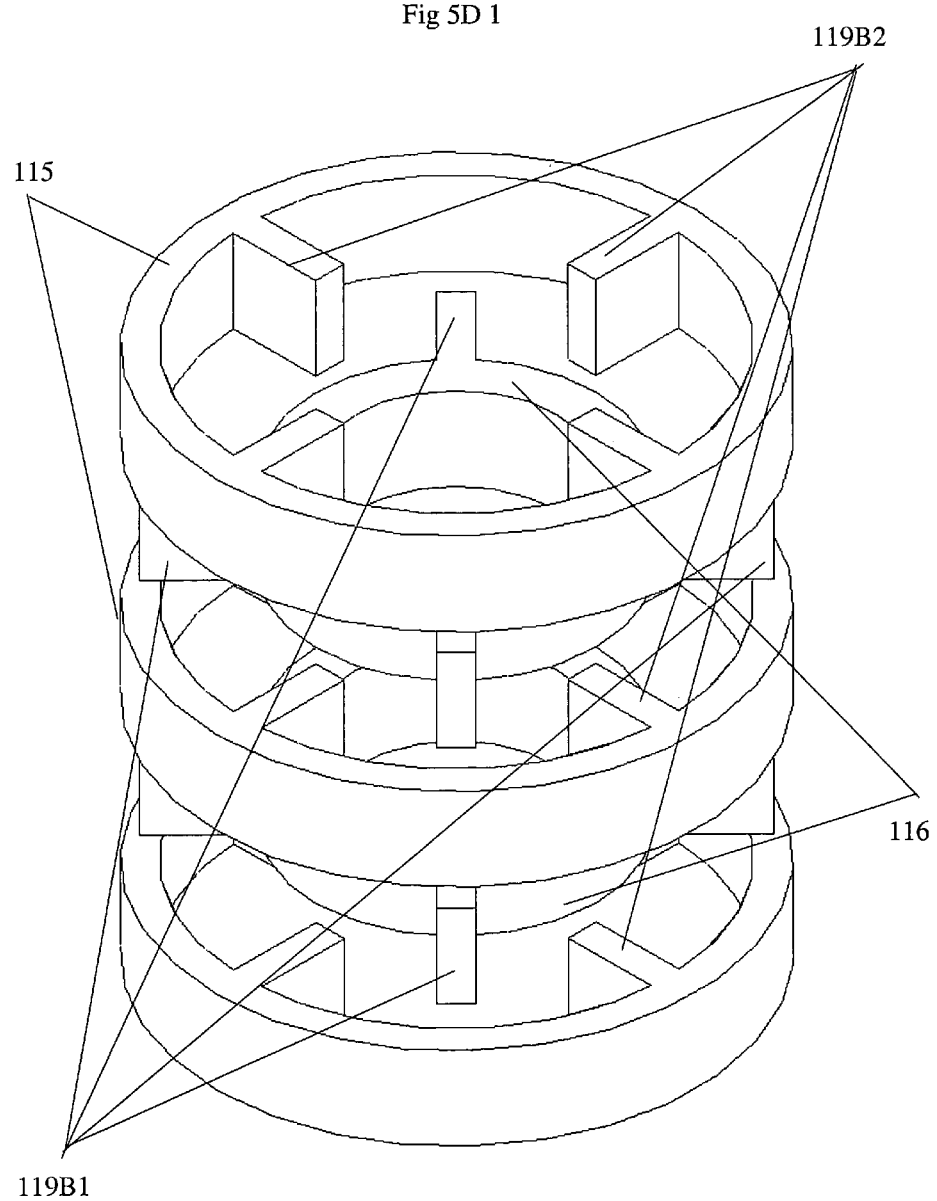

Fig 5D2
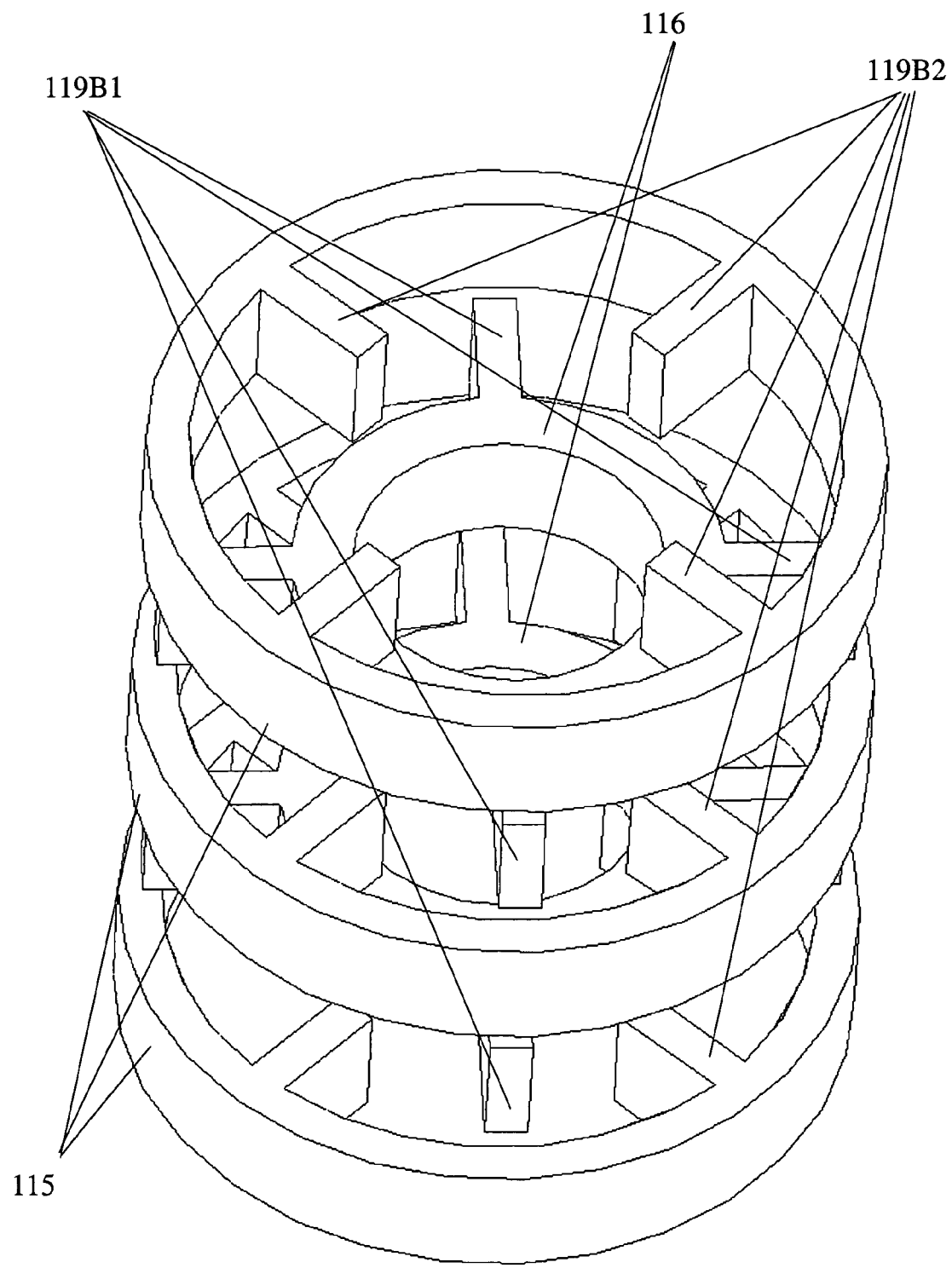

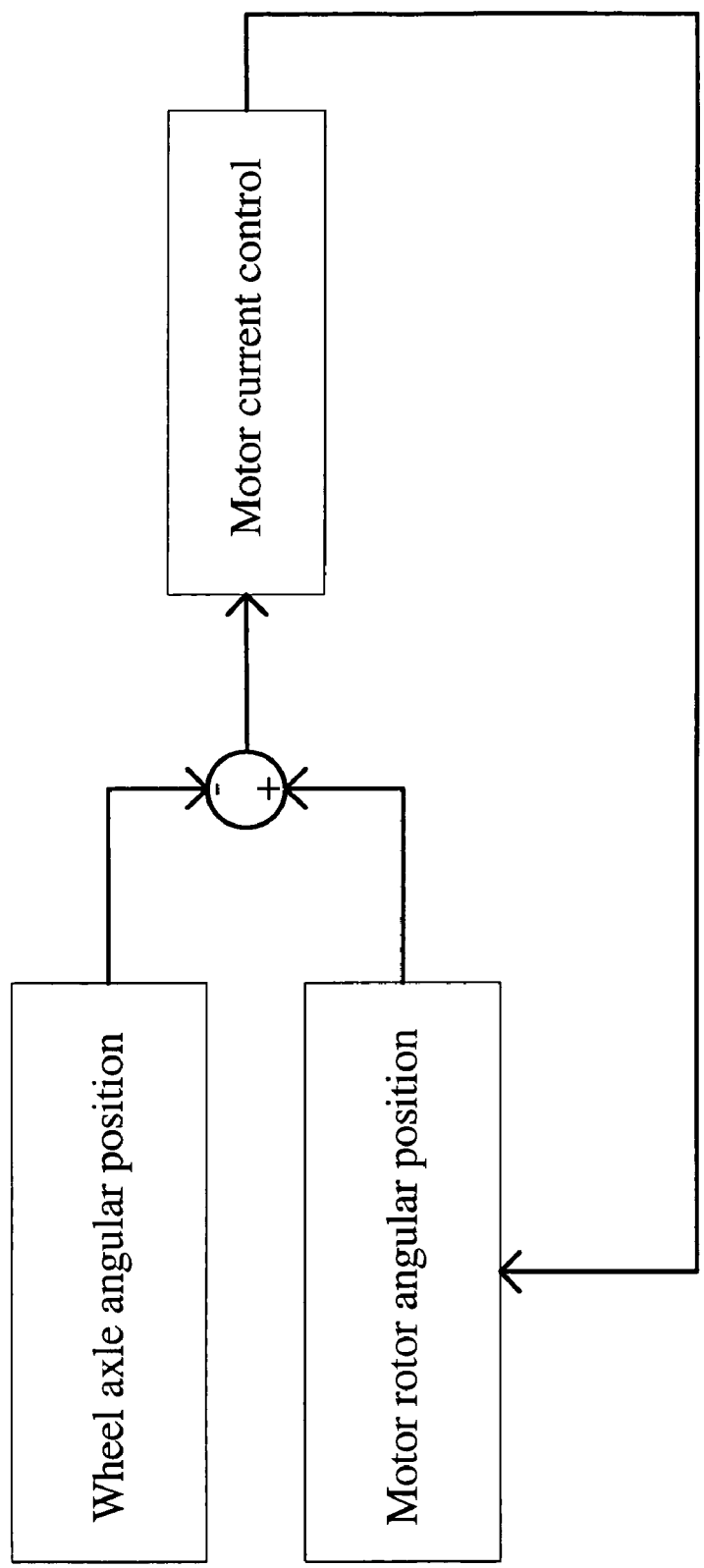

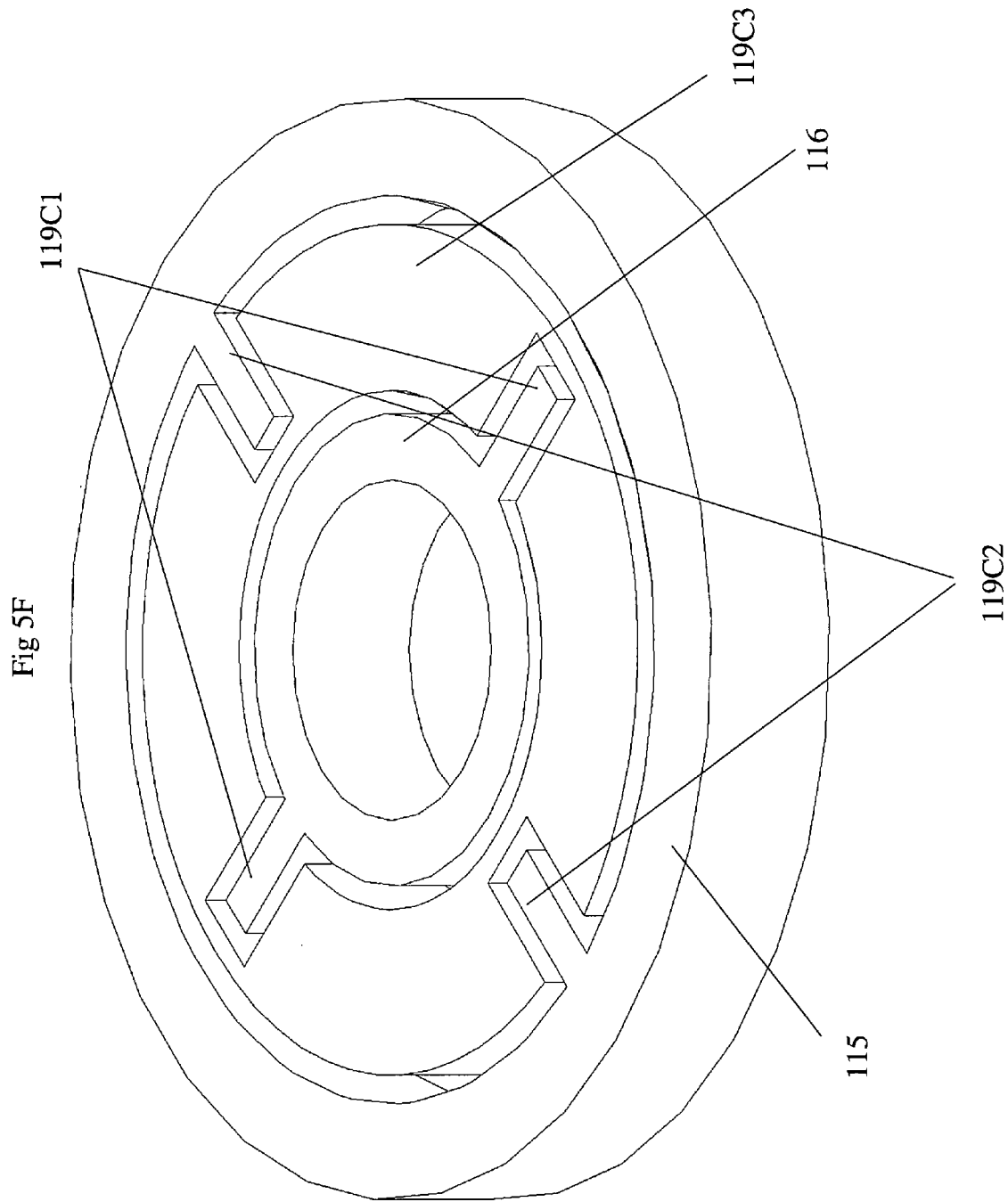

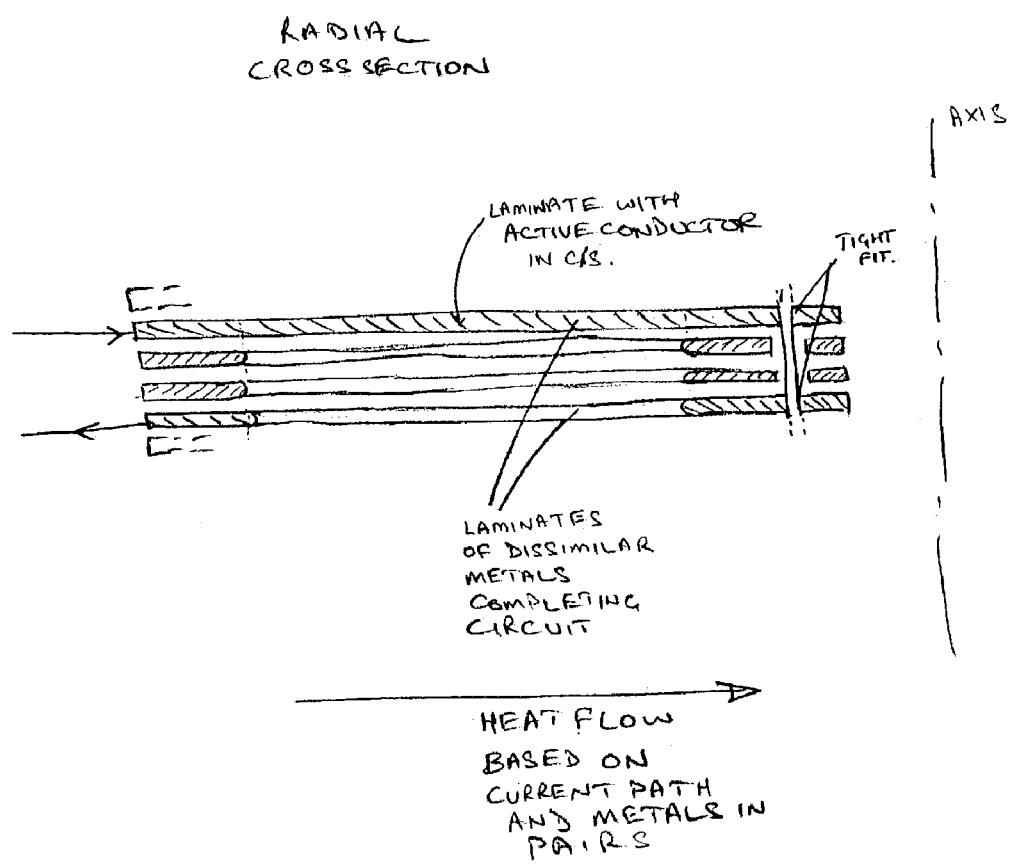

AXIAL GAP ELECTRICAL MACHINE

CROSS REFERENCE TO RELATED APPLICATION

This invention is a Continuation in Part of the application Ser. No. 09/971,035 filed on Oct. 5, 2001; and claims priority from and hereby incorporates herein by reference; EPO 02077015.2 filed 24 May 2002; Provisional application 60/293,388 filed May 24, 2001 and provisional application 60/307,148 filed Jul. 24, 2001.

STATEMENT REGARDING FEDERALLY SPONSORED RESEARCH OR DEVELOPMENT

Not Applicable

REFERENCE TO A MICRO APPENDIX

Not Applicable

BACKGROUND OF INVENTION

This invention relates to axial gap electrical machines and their use in driving wheels, and more particularly relates to such machines employing permanent magnets. Axial gap electrical machines have been proposed in the past. Several examples are found in the background art. For example: Newman et al. U.S. Pat. No. 680,844; William Speicher U.S. Pat. No. 2,899,005; Jermaikian U.S. Pat. No. 6,137,203; Malcolm Williams U.S. Pat. No. 6,046,518; Chang Keun Jum U.S. Pat. No. 6,172,442; Kessinger et al. U.S. Pat. No. 5,744,896; Hazelton et al. U.S. Pat. No. 6,140,734; Smith et al. U.S. Pat. No. 6,181,048 cover various aaspect of the background art.

Although the electric machines described in the this background art are useful for some applications, experience has shown that an improved axial gap machine and arrangements for driving wheels by such motors can be created by departing from the design techniques taught in such machines and following the principles taught and claimed in this application.

SUMMARY

In view of these background references what would be useful is an axial gap electrical machine that can improve both high speed performance and low speed performance that depend on the air gap, adequate cooling for the machine, and provide a means to optimize conductor and magnetic core cross sections to optimize machine performance.

This invention is useful as an axial gap electric machine. In such an environment, the preferred embodiment includes a coil assembly defining a first side and a second side.

OBJECTS & ADVANTAGES

Some of the objects and advantages of the proposed axial gap electrical machine are to provide a unique architecture to overcome critical limits in the air gap at high speeds, while maintaining high torque performance at low speeds. A related object and advantage is to provide a geometry that meets critical force concentrations within these machines.

Another object and advantage of the machine is to provide a winding structure that both minimizes Hall effect losses in the conductor and a magnetic core while optimizing both the conductor density and the core material density, maintaining a homogenous toroidal structure around the periphery of the stator, allowing a broad range of winding configurations from a single structure.

Another object and advantage of the machine is a series of phase lagged oscillators that activate the windings in phased sequence, with power angles adjusted to either create a motor or generator configuration.

Yet other objects an advantages of the present invention are unique approaches to cooling the magnet structure of the machine while in operation.

Yet another object and advantage of the machine is in a wheel motor configuration, where the wheel is separately supported and sprung but driven by a co-axial motor thereby reducing the unsprung mass of the wheel and also minimizing the distortion of the motor elements under wheel loads.

Another object and advantage of the proposed axial gap electrical machines, provides arrangements for cooling said machines.

Yet another object and advantage of the present invention is to provide a means for easy attachment and removal of said axial gap machine used as a vehicle wheel.

BRIEF DESCRIPTION OF DRAWINGS

FIG. 2A is an illustration of adjoining conductors in a winding. Notably the sequence of cross sections of the down conductor and the up conductors are in the same direction unlike in conventional windings where subsequent layers of such ribbon conductors would be in opposite directions in each winding.

FIG. 2B is an illustration of the new proposed windings where the structure permits lagged arrangement for windings that are "universally" variable in width for a given pole size thereby allowing a variable size (and number) of windings. A conventional winding arrangement is shown for comparison.

FIG. 2C is an illustration of a single turn of ribbon conductor in an embodiment of the proposed new windings illustrating the twist in the conductor.

FIG. 2D illustrates an embodiment for serial connection of adjoining loops in the windings. They may be assembled as individual loops and connected using the insulator and conductor configuration such that the second end of a conductor makes electrical contact with the first end of the next conductor.

FIG. 4 in an illustration of possible connections for the phase lagged oscillators proposed for different windings both in the proposed new ribbon conductor windings and for conventional windings.

FIG. 5C is an illustration of magnetic elements with pole surfaces placed to repel each other and thereby to convey the torque from the motor to the wheel.

FIGS. 5D1 and 5D2 are illustrations of two sets of radial vanes the first connected to the motor rotor and the second connected to the wheel in a fluid to convey the torque front the motor to the wheel.

FIG. 5E illustrates a feedback of relative angular displacement of the wheel relative to the rotor for feedback control to the motor.

FIG. 5F illustrates a plurality of splines attached to the outer casing of the motor (rotor) that engage a plurality of splines around the inside of the wheel.

FIG. 6 illustrates the bimetallic construction of the layers in the laminates to induce heat flow in a desired direction neither towards the hub or towards the periphery contributing to adequate heat dissipation arrangements.

LIST OF REFERENCE NUMBERS

Figure 1:
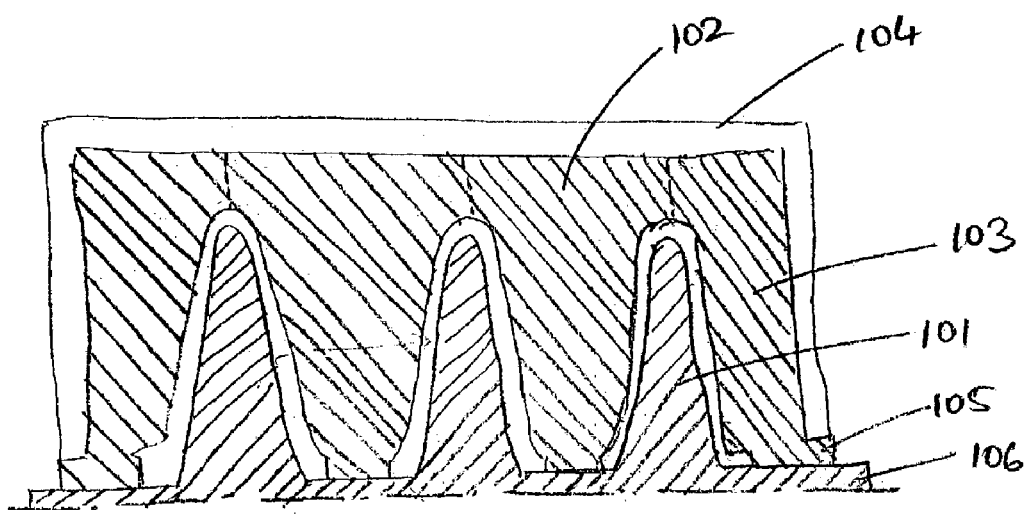
FIG. 1 is an illustration of a cross section of the axial gap machine illustrating tapered cross section for the rotor sections and the stator sections.
Figure 2E:
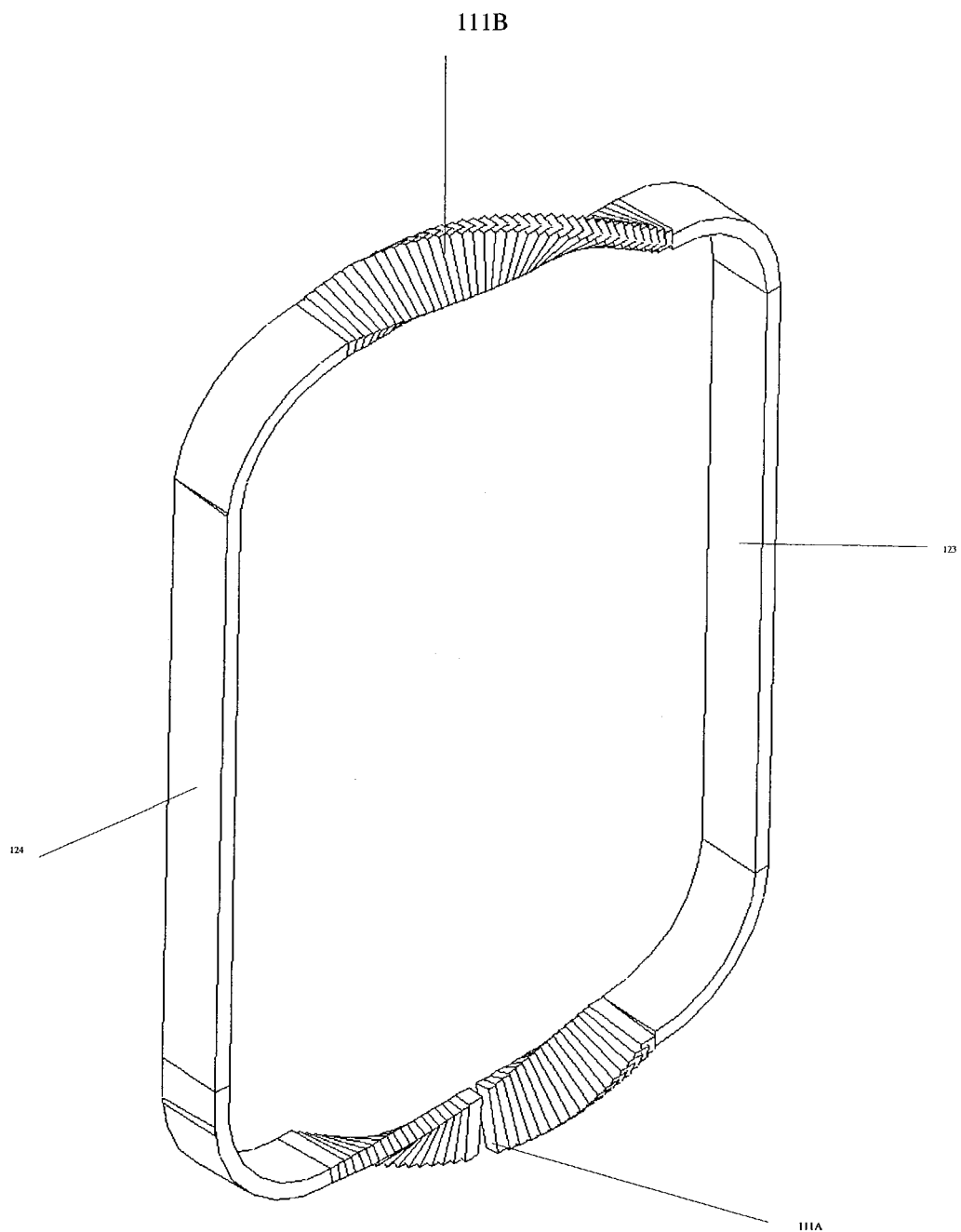
FIG. 2E, 2F, 2G are illustrations of a single turn of ribbon conductor in an embodiment of the proposed new windings illustrating the twist in the conductor with the gap shown on the non-working conductor near the axle.
Figure 2F:
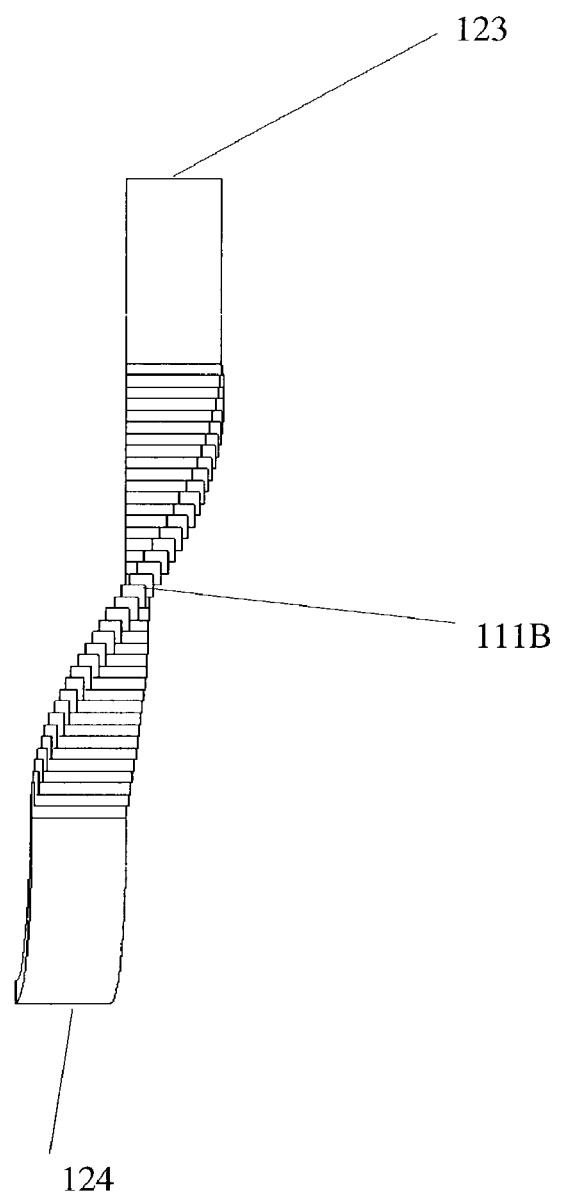
Figure 2G:
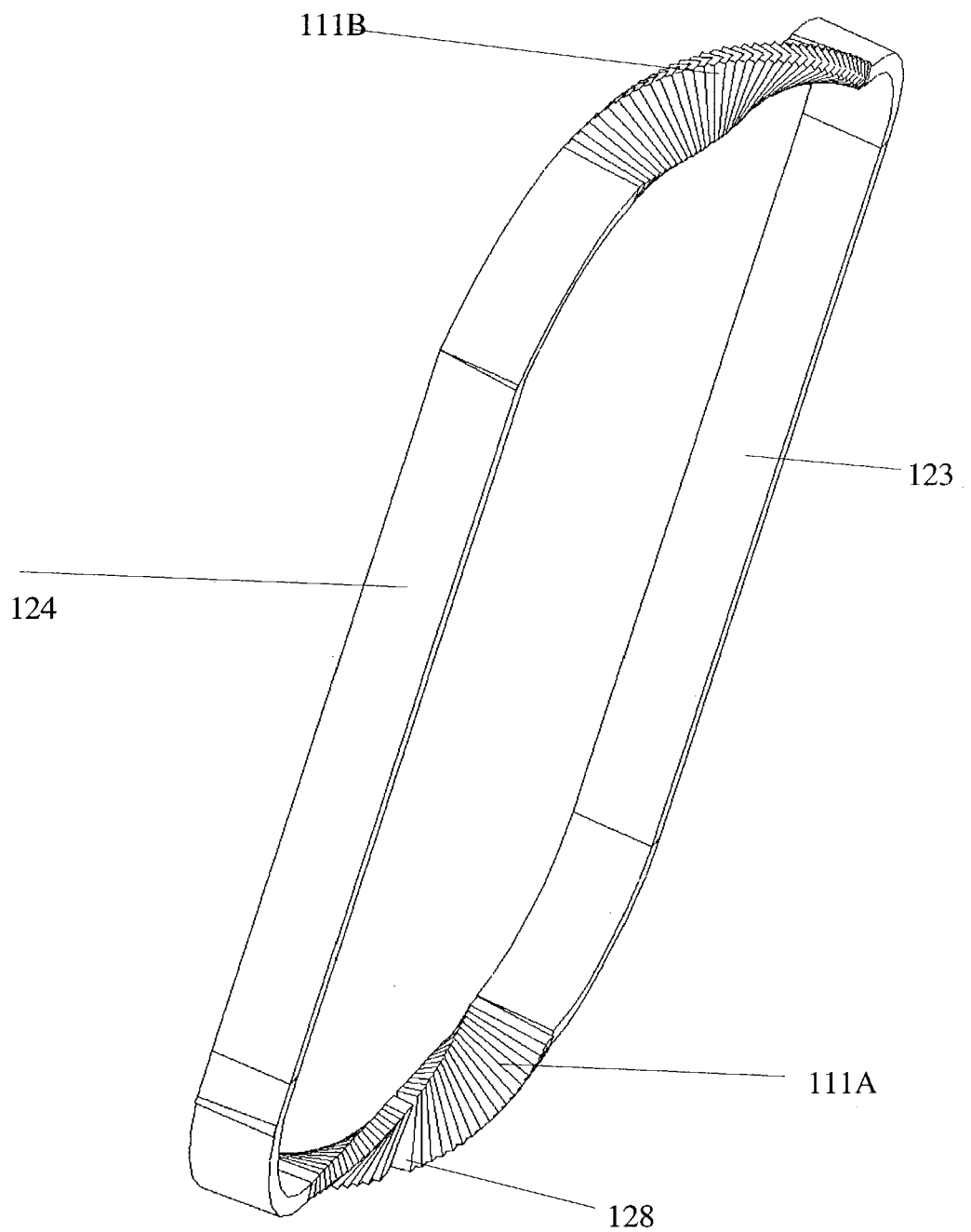
Figure 2H:
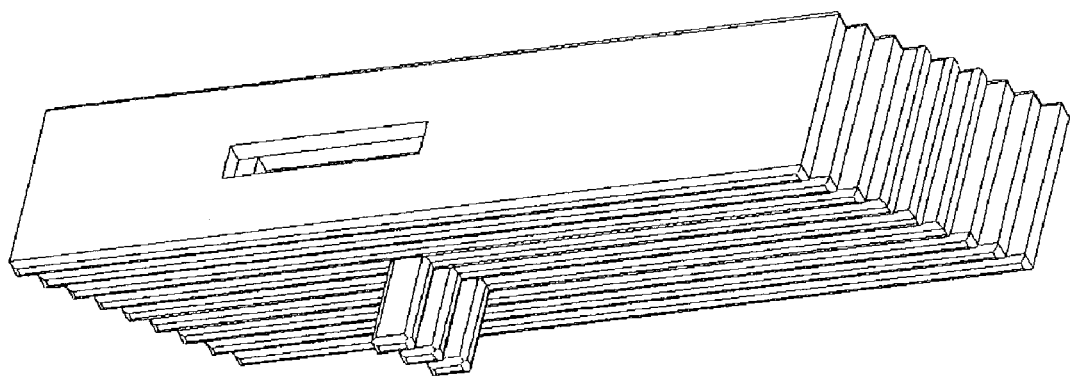
FIG. 2H, 2I illustrates several adjoining ribbon conductors that are arranged here for parallel connection The conductors that need to be connected are pinned and the others are slotted to avoid electrical contact. These illustrations show the conductors straight for clarity but they would normally be twisted except for a small section in the middle of each non-working conductor.
Figure 2I:
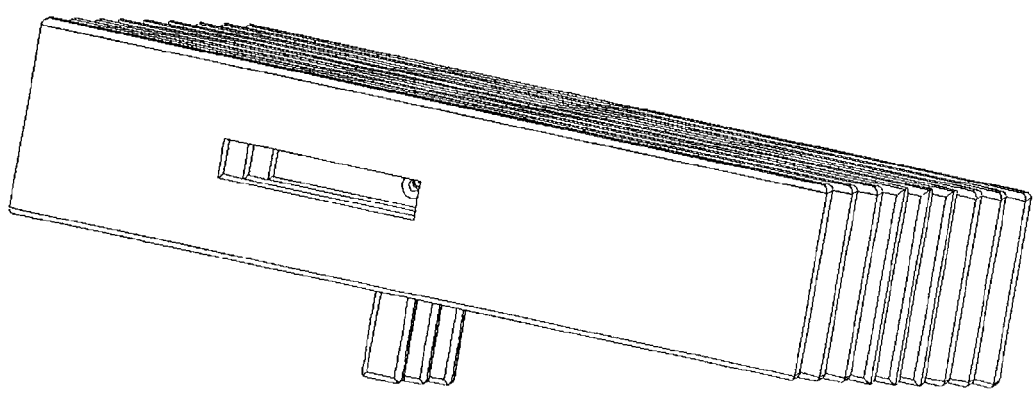
Figure 3A:
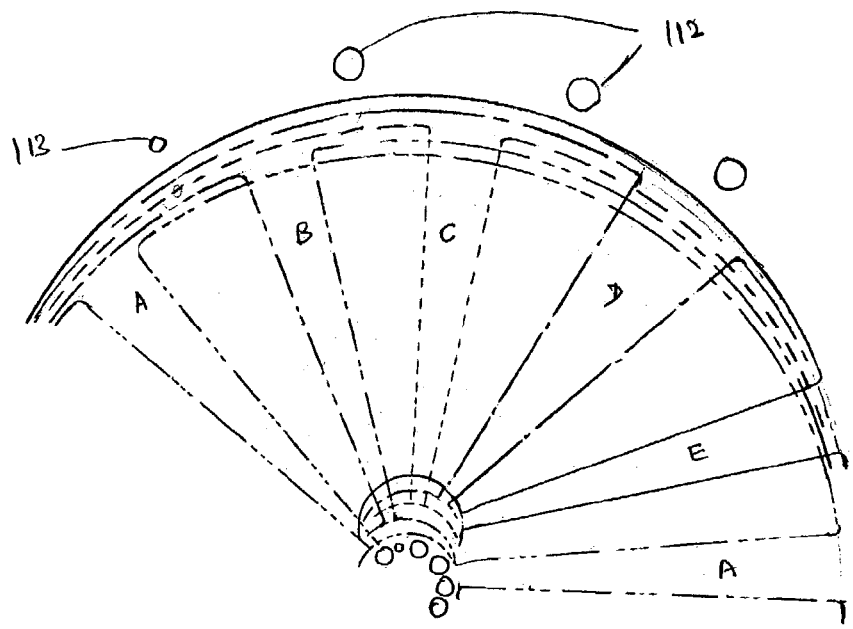
FIG. 3A is an illustration of several laminates or layers of conductors, each layer having radial conductors on selected sections between the core sections to complete the circuit as desired. The layers may have multiple layers as shown with the return conductor several layers away using an intervening radial section. Pins are illustrated that connect selected layers without contacting intervening layers.
Figure 3B:
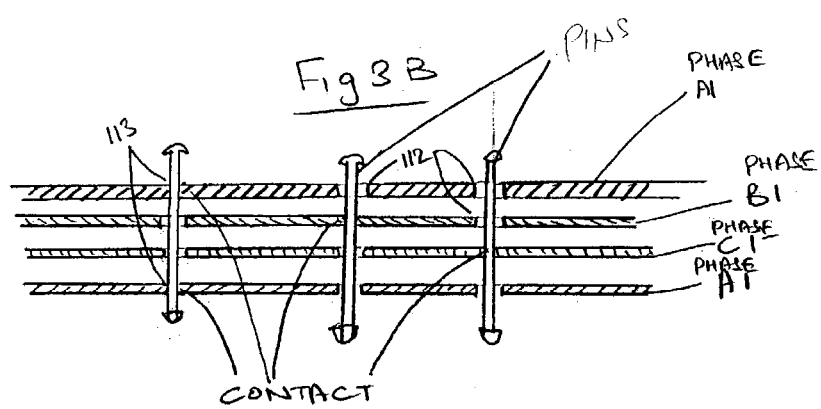
FIG. 3B is an illustration of the connection with the pins that contact some layers. Apertures in other layers are large enough to avoid contact.
Figure 5A:
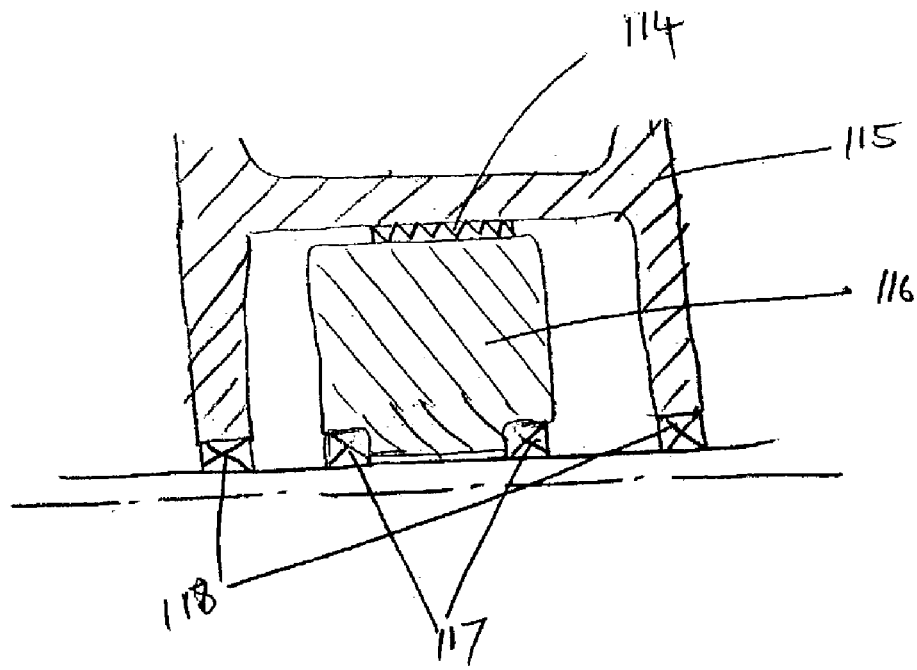
FIG. 5A is an illustration of separate bearings for the motor and the wheel bearings with a flexible connection such as splines or leaf springs to transfer torque.
Figure 5B:
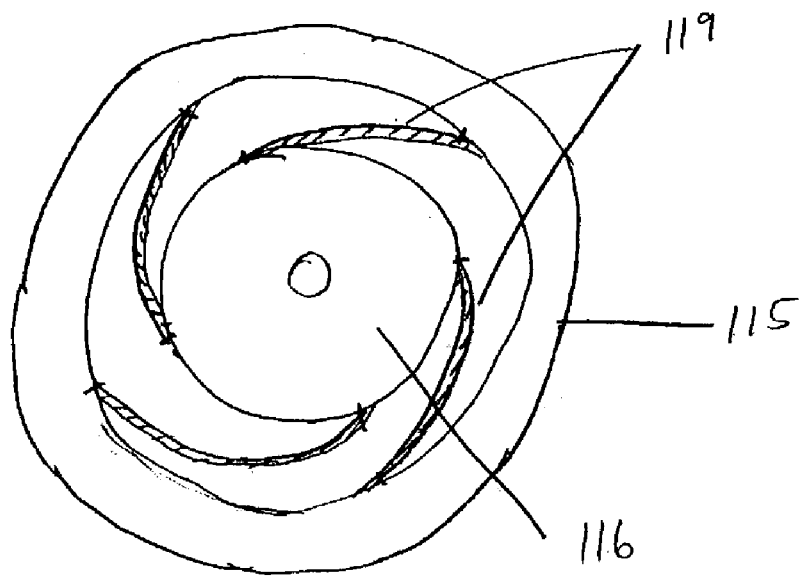
FIG. 5B is an illustration of leaf springs to convey the torque from the motor to the wheel.
Figure 7:
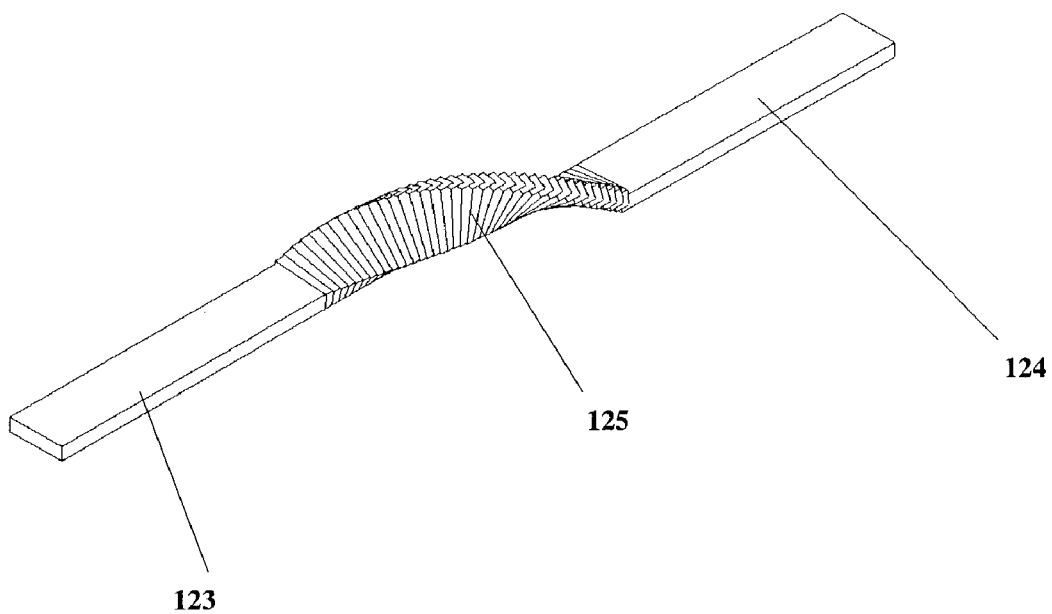
FIG. 7, 8 illustrates the twist in the ribbon conductor on one of the non working sections. In the interest of clarity the working conductors are shown linearly disposed towards the twisted non-working section and the other non-working section is not shown. In a normal working configuration the two working conductors will be bent down to be oriented radially in the machine while the non-working conductors with the twists follow circumferential arcs either near the axle or near the periphery of the stator.
Figure 8:
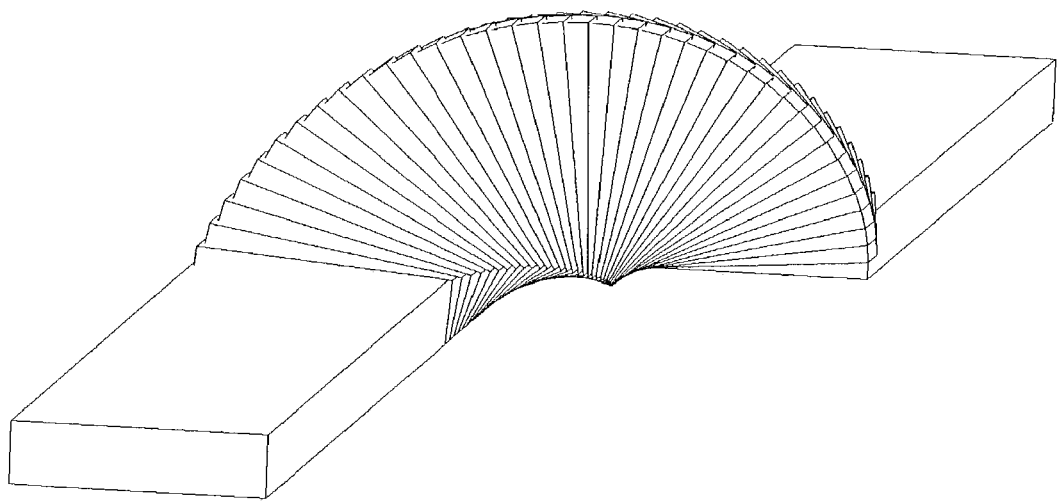
Figure 9:
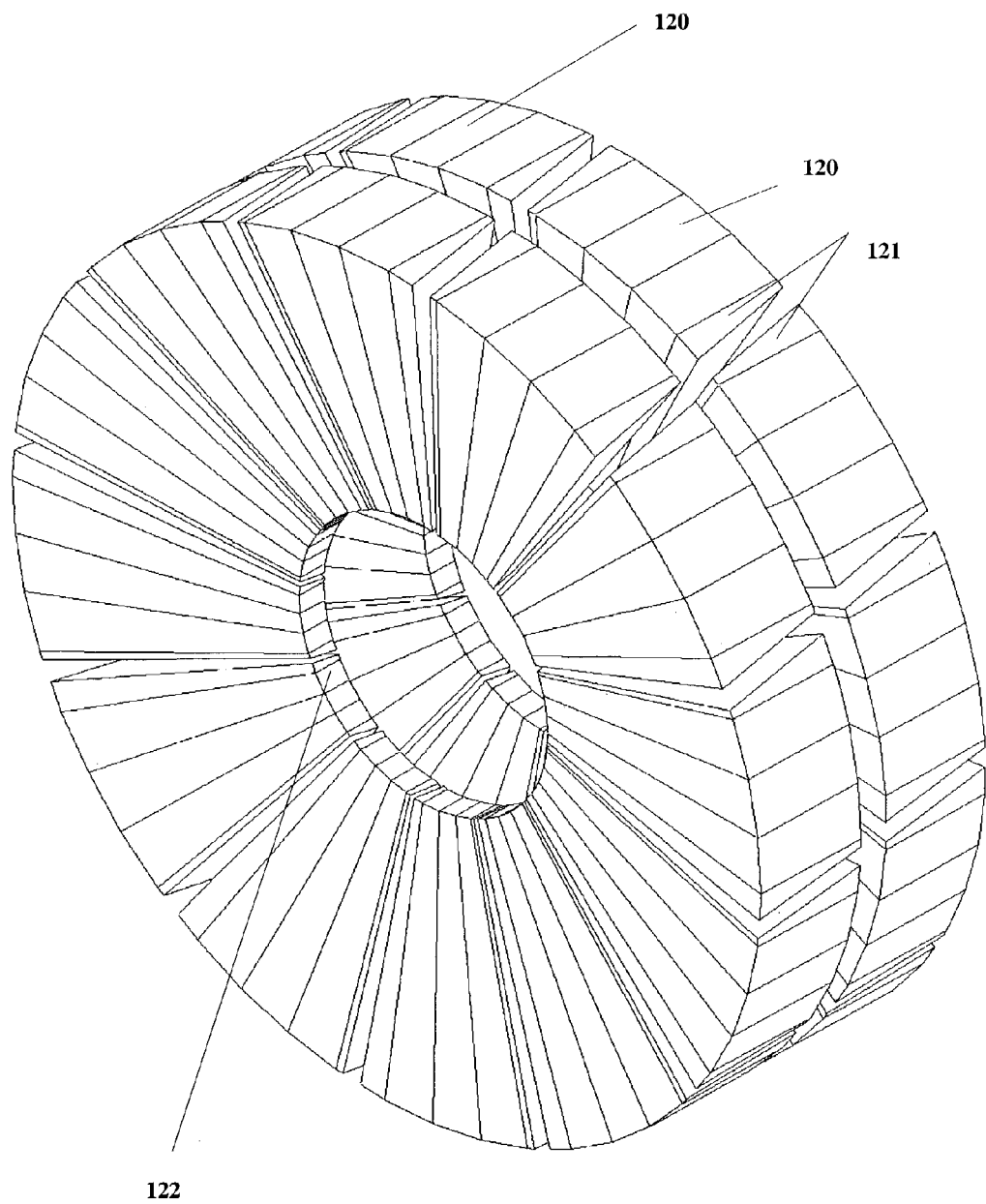
FIG. 9 illustrates an embodiment of the magnet assembly in the present invention. Each of the magnet sections are shown to be radially separated into several pieces and bonded together to minimize eddy current losses. Further the illustrated embodiment has the magnet sections with air gaps between them for cooling. The magnet sections are supported by minimal brackets (not shown) that hold the magnets in relative positions. However the centrifugal forces are resisted by the housing of the motor which supports the rotor. The gaps between the magnets may have a small pitch to induce airflow through the gaps in one direction. In some embodiments the magnet sections and the brackets may be pivotally and/or slidably mounted for changing the air gap as noted herein. The magnet assembly in the illustrated embodiment is tapered to be narrower towards the axis to allow air gap control as noted herein.
Figure 10:
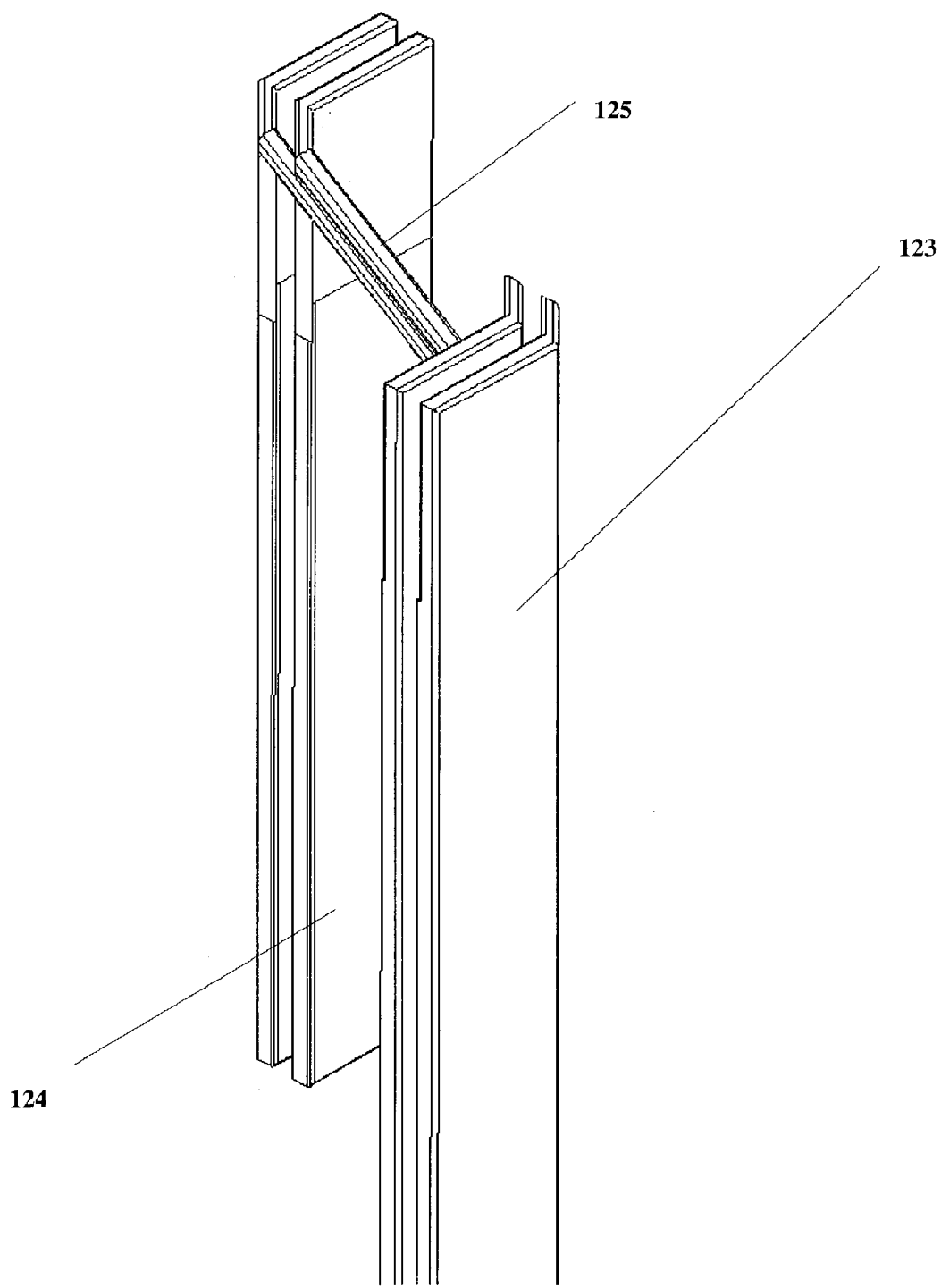
FIG. 10, 11, 12 illustrates an embodiment of the invention where rigid ribbon working conductors and pressed or formed nonworking conductors welded or otherwise attached to the working conductors may be used. The illustrated non-working conductors (on one side) conform to the topological constraints for the double torroid construction of this invention with conductors in a single loop having working conductors in two adjoining torroidal sets of conductors.
Figure 11:
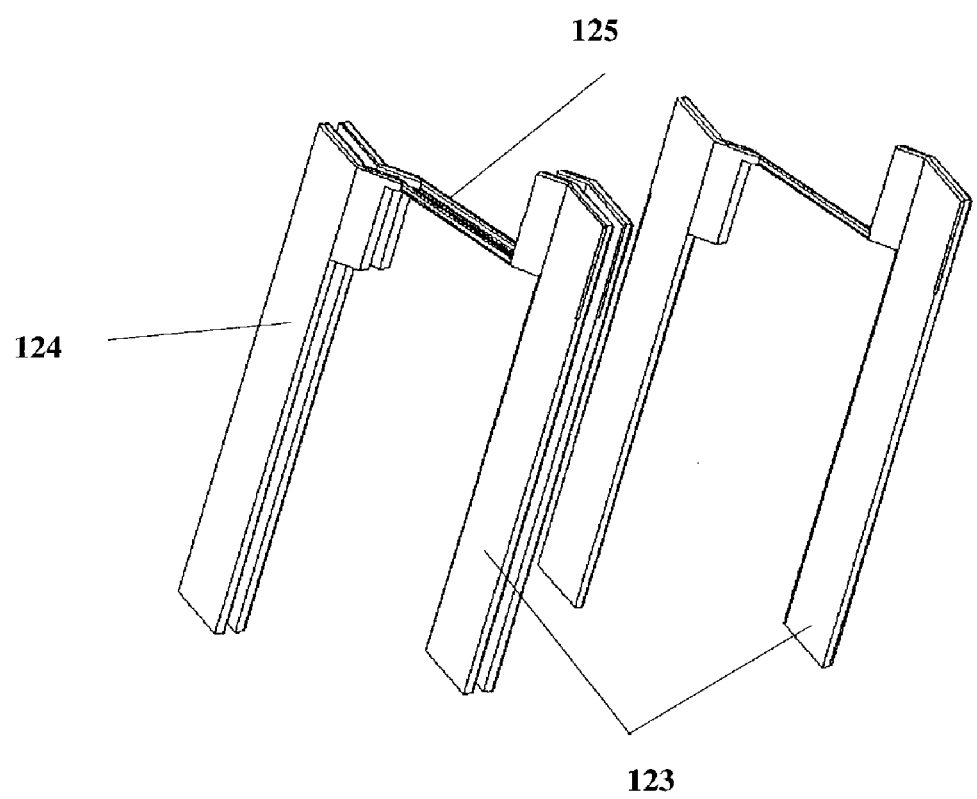
Figure 12:
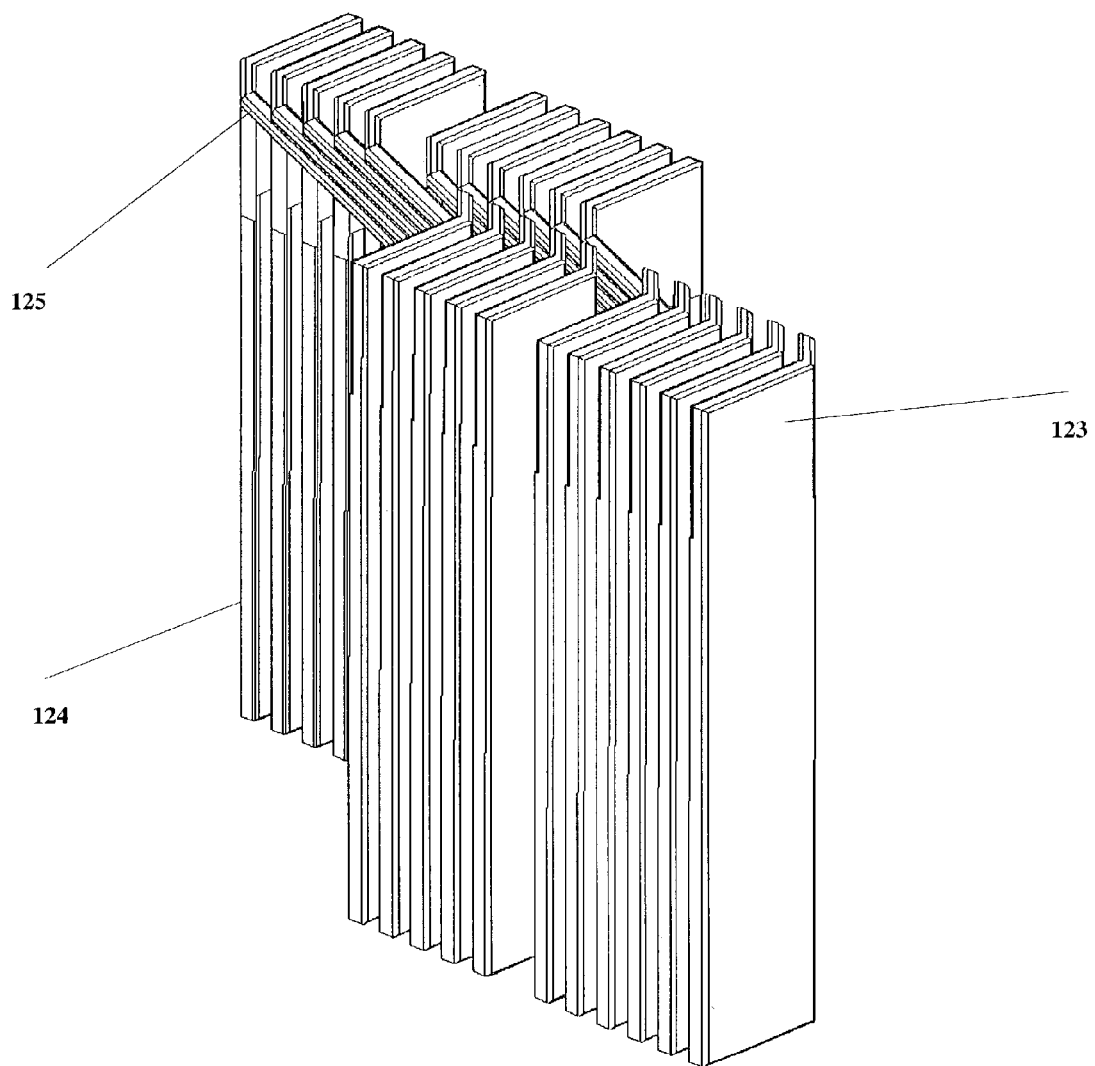
Figure 13:
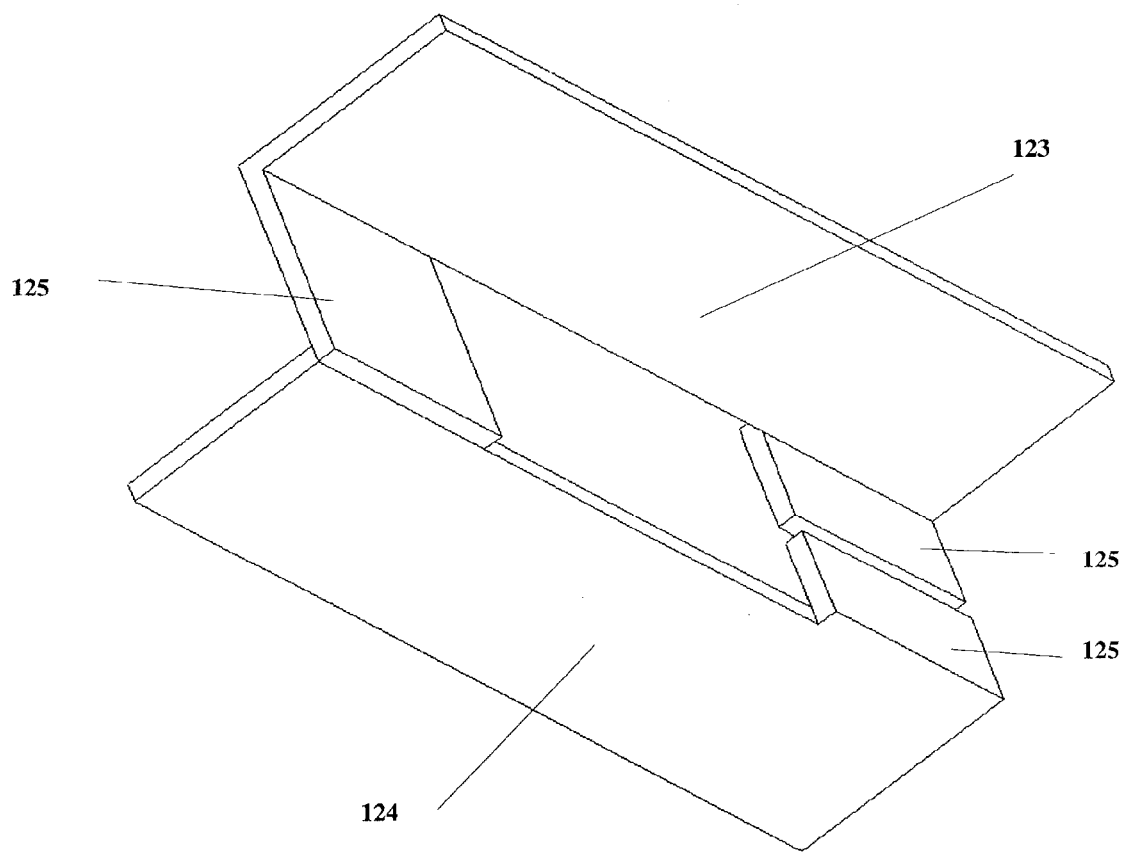
FIG. 13 illustrates another embodiment that has simpler arrangements for the non-working conductors but will result in working conductors that are not disposed with their widths radially to minimize eddy current losses. This illustration show a gap in the non-working conductor at the inner axial end. These may be connected in series with adjoining lops or in parallel to adjoining loops the arrangements for these are noted herein.
Figure 14:
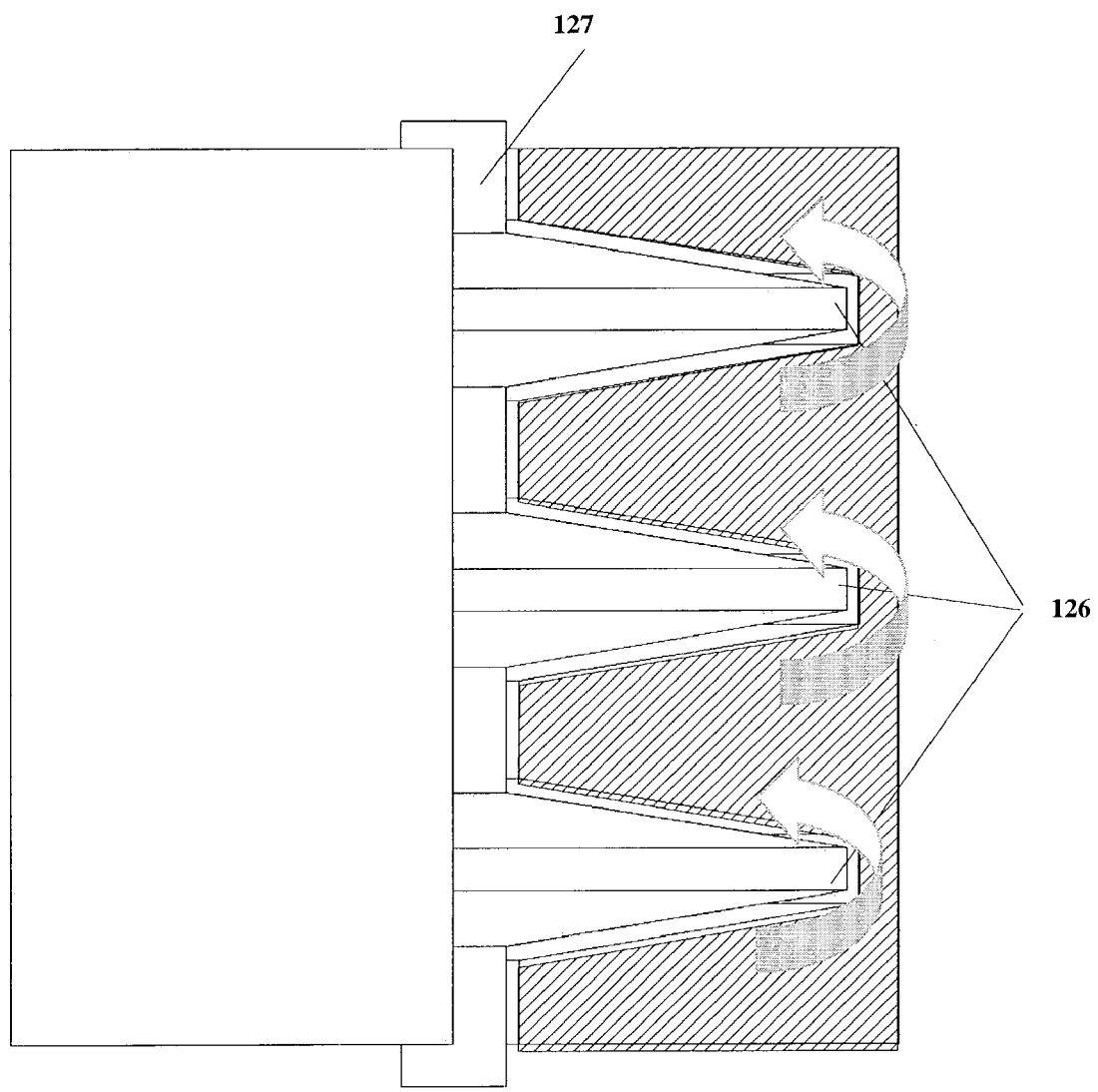
FIG. 14 illustrates the bimetallic construction of the conducting strip to induce heat flow in towards the hub and to induce a cold junction at the periphery. In the illustrated embodiment, there is airflow through the gaps between the magnets in each of the assembly that is forced through the stator/rotor airgap and over the edge of the stator and the cold junction. Thereby cooling the magnets. There is normally a direct current superimposed on the working currents of the motor/generator to induce the thermo electric effects. In this embodiment the axle may be cooled internally with coolant liquid or gasses.
Figure 15:
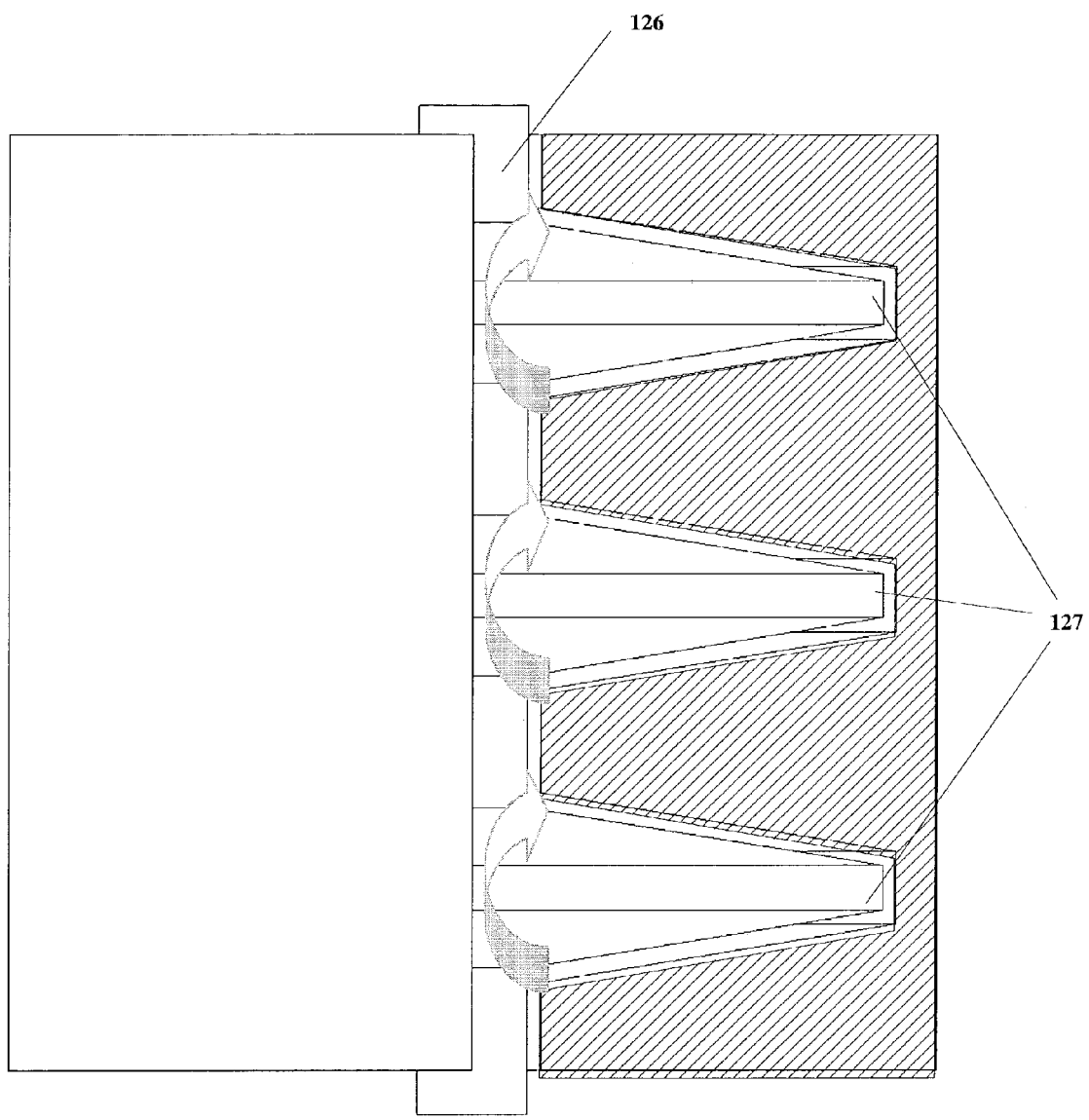
FIG. 15 illustrates the bimetallic construction of the conducting strip to induce heat flow out towards the periphery and to induce a cold junction at the axle. In the illustrated embodiment, there is airflow through the gaps between the magnets in each of the assembly that is forced through the stator/rotor airgap and through ports in the stator near the axle for heat exchange with the cooled conductors. Thereby cooling the magnets. There is normally a direct current superimposed on the working currents of the motor/generator to induce the thermo electric effects. Fins may be installed in the vicinity of the hot junctions on the outer body of the rotor to cool the hot junction.
Figure 16:
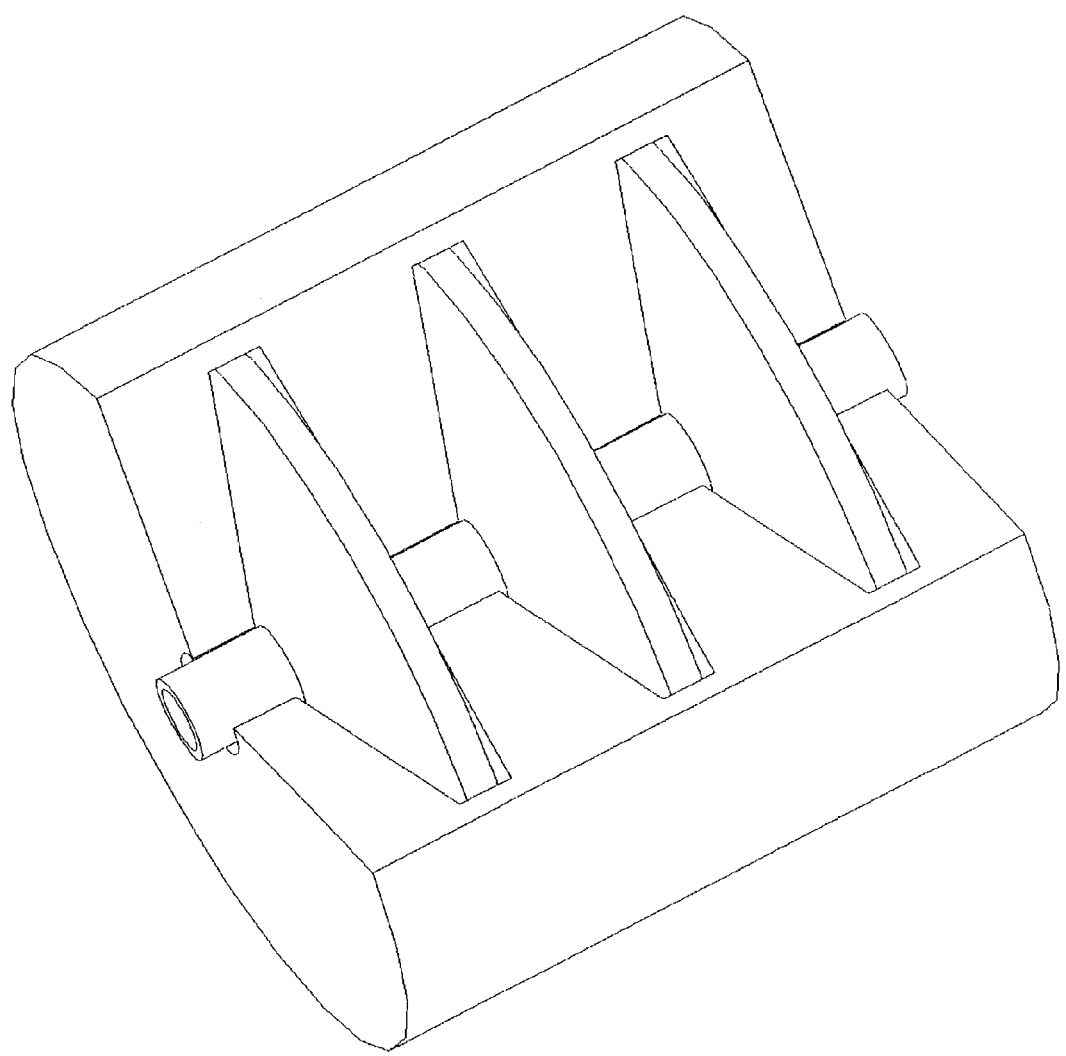
FIG. 16 illustrates a cut away view of an embodiment with multiple rotors and stators and a tapered rotor/stator construction.
Figure 17:
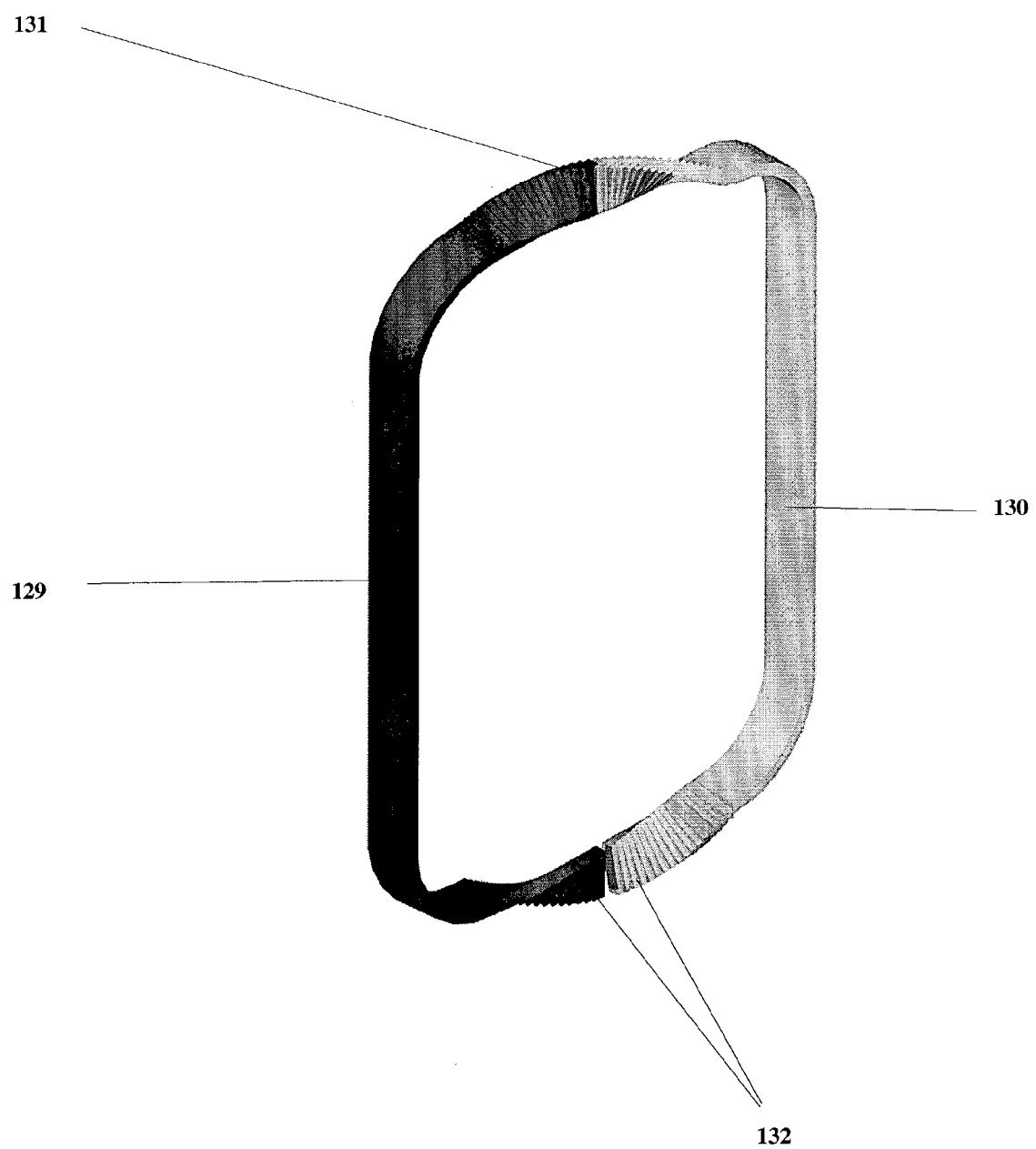
FIG. 17 illustrates a bimetallic construction for a single loop of the stator windings.

101—Stator winding section tapered construction
102—Rotor Magnet assembly middle section—tapered construction
103—Rotor Magnet Assembly end section—tapered construction
104—Motor housing
105—Rotor Bearing
106—stator support axle.
107A—First Ribbon conductor first Radial component (current into paper)
107B—First Ribbon conductor second radial component (current out of paper)
108A—Second Ribbon conductor first Radial component (current into paper)

108B—Second Ribbon conductor second radial component (current out of paper)
109A—Indicator—current out of paper
109B—Indicator—Current into paper
110A—Edge 1 of the ribbon conductor
110B—Edge 2 of the ribbon conductor
111A—Twist in center section of ribbon conductor
111B—Twist in circumferential section of ribbon conductor.
112—Open hole on this layer—no contact with pin
113—Closed/tight hole on this layer—electrical contact with pin
114—flexible peripheral wheel coupling
115—Wheel
116—Motor/generator Rotor
117—Motor/Generator Rotor bearing
118—Wheel bearing
119—leaf springs—torque transfer in tension
119A—magnetic elements—torque transfer
119B1—Radial Vanes connected to rotor—torque transfer
119B2—Radial Vanes connected to wheel—torque transfer
119C1—Splines on motor casing—torque transfer
119C2—Splines on wheel—torque transfer
119C3—Spline socket for engagement
120—An inside single magnet element as part of a single magnet section.
121—An edge single magnet element as part of a single magnet section
122—The inside end of the magnet sector showing a narrower cross section
123—working conductor—side 1 of toroidal coil
124—working conductor—side 2 of toroidal coil.
125—Non-working conductor that meets the topological constraints for this embodiment
126—Cold junction of the bimetallic construction of windings.
127—Hot junction of the windings of the bimetallic construction of the windings.
128—Gap where loop is connected to adjoining loops at each end series or parallel
129—Working conductor—metal 1
130—Working conductor—metal 2
131—bimetallic junction 1
132—bimetallic junction 2 (between adjoining loops)
133—Stator mount and wheel shock absorber housing (connected in some embodiments to wheel assembly steering and shock absorption devices)
134—Wheel axle
135—Support between wheel axle and shock absorber (either supporting the wheel axle or the shock absorber depending on the embodiment)
136—Wheel support

DETAILED DESCRIPTION OF INVENTION

The proposed axial gap machine has a plurality of disk-like magnet assemblies that constitute the rotor of the machine, that are installed to the outer body of the machine. The outer body in turn completes the magnetic circuit for the magnet assemblies, which provide the means for air gaps with axial magnetic fields. Moreover, one or more of these rotor magnet assembly disks may be supported with bearings on the axis to which the stator is fixed resulting in the assembled rotor resting on the central axle on a plurality of bearings that are mounted at the radially inner edge of two or more of the said magnet assemblies that interleave the stator disks. Such an arrangement may be constructed from separate disk assemblies of magnets as in rotors of axial field machines—well disclosed in the background art, that are attached together leaving adequate space between them for the required axial air gaps and a stator in each intervening space between adjoining rotor magnet assemblies.

The stator is composed of a plurality of disks that are each composed of windings that are fixed to the central axis of the machine. Each of these disks are interspersed with the rotor disks as described above. The said axis also provides the support for a wheel in a vehicle or gear or pulley arrangements in machines.

According to another feature of the invention, coils for an electric machine may be fabricated by conventional windings and cores or the following means.

Windings may be composed of elements constructed in sectors of a torroid or annular ring that interlock as follows: Each of the conductors are shaped to form a loop with open ends preferably at the outer circumferential edge of the torroidal or annular shape that is described. The cross section of the conductor is of a ribbon with width much greater than the thickness to minimize the Hall effect on the conductors. Magnetic core material of small cross section and in elements of length equal to the width of the ribbon may be attached to the conduction ribbon on one or both sides with insulating film. The conducting ribbon is of course insulated. The ribbon shaped conductor may be formed in many ways. One of the approaches are as follows: The ribbon shaped conductor is formed into a loop first without twisting the ribbon (0 degrees twist). The loop is further formed by straightening two diametrically opposed edges to form the two radial sections at a predetermined angle to each other that define the sector of the torroid or annular ring that a single loop of the winding will cover. However, one of these two radial sections of ribbon are twisted by 180 degrees and maintains this angular orientation along its entire length. This results in the corresponding wide surface of the ribbon on both radial sections facing the same direction. This twist in the ribbon results in the twist being entirely generated through 180 degrees at the circumferential sections of the loop. Finally the two radial sections are placed so that they are radii of adjoining cylinders about the same axis. Stated another way, the circles of rotation of the two radial sections of the ribbon, develop two cylinders that are co axial and adjoining each other but do not intersect each other. This construction of the loop allows a series of such loops to interlock with each other to form a complete torroid or annular ring without any gaps. Moreover, if the magnetic material is bonded to the ribbon this will form a distributed core as well. With this construction of interlocking ribbons, the cross section of the torroid or annular ring has two ribbon shaped conductors edge to edge one each from the loops on either side of the torroid or annular ring. Each of the independent loops have terminals or simply flanges at each end of the ribbon loop positioned on the inner or outer circumferential non-working section. Such flanges may be connected in series or parallel to each of the phases of the power circuits, to meet the particular winding need. Such connections may be made with pins that connect selected flanges. Notably, such a winding can be universal except for the sector angle that is described by the loops, in that the individual loops can be connected to any number of phases and turns per winding. A further improvement would be to use conductors of widening cross section on the radial sections to maximize the conductor crossection in each loop. The ribbon may alternatively be twisted by 360 degrees from end to end of the loop (instead of a net 0 degrees) by twisting each of the circumferential sections by 180 degrees in the same direction (rather than in opposite directions for the 0 degrees net). In either of these arrangements, the optimal utilization of the stator winding volume is achieved by adjusting the thickness of the conductors in relation to the thickness of the ferromagnetic material to maximize the flux linkage to the rotor by lowering the reluctance with more ferromagnetic core material while maximizing the conductor thickness and the current density. The conductor ribbons may be stranded and or braided wire to be more flexible in this arrangement. In some embodiments the entire back shaped as an annular flat disk between the two sections of conductors provides additional rigidity to the windings but is not physically connected to the axle. Other similar embodiments may not have a back iron element at all and have the formed windings (with interspersed core elements if used) support themselves as the entire stator. The entire load is transferred through the material of the windings to the axle. In other embodiments, the ribbon conductors may be either slotted on the inside circumferential sections or bent around (at the sections of the ribbon that is twisted, at a point where the width is parallel to the radius) to accommodate radial elements of the supporting back iron that may lie between the concentric cylinders formed by the windings as noted above. The back iron may be radially serrated to accommodate the edges of the windings and bonded together by methods well disclosed in the background art. Moreover, if the stator windings are predefined at the time of assembly and the physical angle of each phase winding is known in advance, the back iron may have raised sections that index the windings between these sections of the ribbon windings to transfer torque during operation. In addition the ribbon conductors may be shaped to index the sides of the back iron disk. Yet other embodiments several selected adjacent sections of the ribbon windings have broader cross sections in the radial (or working) sections of the ribbons thereby creating a set of splines that may interlock with splines in the back iron to transfer torque. The above winding arrangement may also be used in an embodiment with the permanent magnet rotor fixed to the axle and the stator attached to the housing of the machine.

Several embodiments are possible with the windings in the current invention using topologically equivalent conductor shapes. For example individual ribbon loops may be constructed to have two flanges near the axial edge of the working conductors on each of the legs of the loop, so that in the winding position these flanges of adjoining loops form a ring around the axis of the machine that can be used for support and also heat dissipation if they engage fixed elements of the axle. Moreover, such flanged may be arranged to be of varying lengths such that when assembled as a winding they form a splined profile that will better transfer torque to the axle. Another application in using topologically equivalent conductors to flat ribbon conductor loops is to fold the conductor at the non-working ends to reduce the edge length on one side and not the other so as to allow easier assembly of the loops in the stator torroid. Yet another topologically equivalent form is to have an "O" shaped flat ribbon conductor (that may be stamped out) with straight sides that correspond with the length of the working conductors of the loop and straight conductors of the length of the non-working peripheral and axial conductors respectively. The closed form needs to be cut and separated at a point on the inner non-working conductor section to connect with adjoining loops. Sections of the Non-working conductors can then be bent to be perpendicular to the working conductors to permit the loop and winding configuration of the twisted conductor torroid construction noted in this invention with one notable difference- The torroid generated by these open loops that form the windings may not have an axis perpendicular to the width of the conductor but be at an angle thereby compromising he eddy current loss characteristics and the airgap.

The above winding arrangements utilize the entire space in the torroid or annular ring with either conductors or magnetic core material. This is particularly so in embodiments where the radial conductors are made to be wider towards the outside of the coil. Furthermore it is possible to "grind" the windings or ribbons along with the distributed core to have any desired cross section for the stator thereby optimizing the air gap that may follow a non-linear rotor cross section as in some special rotor configurations noted in this invention.

Yet another embodiment will have the ribbon conductors packed with powder metal and compacted with dynamic magnetic compaction or other techniques available in the background art. This will improve the efficiency of utilization of space between conductors for a lower reluctance magnetic path. This is particularly useful if a constant thickness conductor is used and there is a greater gap between adjoining conductors towards the outer end of the working conductors. Yet another feature of this invention is an embodiment that has the radial sections of each ribbon conductor preformed and attached to a (insulating) membrane bag of the same shape as a side of each of the radial sections of the conductor, containing powder metal in a predetermined quantity. At the time of assembly of the coil, the powder metal will be redistributed in the thin membrane bags to take up all the available space between the conductors—more towards the outer ends of the radii. The assembly may then be compacted as noted above. Following the assembly of the windings as follows, the surface of the winding with the attached core material may be ground or machined to expose the surface of the ribbon conductor from the surrounding core material so that a magnetic gap is established to minimize magnetic leakage in the machine.

The present invention may use rotor disks with magnets constructed in the conventional manner as disclosed in the background art or use rotor disks that are tapered to be narrower at the center and broader and the periphery where they are attached to the body of the rotating shell, and wherein the stator disks are tapered to be broader at the base at the axis and narrower towards the edge of the disks. Thereby the geometry will ensure that of the taper rates are the same for stator and the rotor, the airgap will remain the same radially across the machine for all the disks. Moreover, as the greatest torsional forces on the stator are near the axis and the greatest tortional forces on the rotor are near the periphery, this geometry can optimize material usage to minimize weight of the machine for the required strength characteristics.

An additional feature of the present invention with the above tapered rotor design can be utilized to optimize the air gap for different speeds for operation. A small air gap is desired in the machine at low speeds to maximize the torque generated by the machine. However as the machine builds speed, both back EMF and air resistance in the air gap will limit the speed of the machine significantly. The tapered design in the present invention can be adapted to automatically increase the air gap at high speed. This can be a smooth gradual process that matches the gap for the speed of performance. This is achieved by moving the sections of the rotor radially outwards by a very small amount. Notably, by having different gradients of taper of the sides of the rotor radially, the rate of change of the air gap can be different for different radial distances from the axis. For example, as the relative linear velocity between the stator and the rotor at the periphery of the motor rises more rapidly as the motor accelerates, a greater increase in air gap could be beneficial at the periphery. This can be achieved by having a steeper taper at the periphery of the motor (rotor and stator) and a more gradual taper towards the center of the motor. The exact tapers can be designed using computer simulations of the effect of back EMF and turbulent flow in the air gap. This movement may be achieved with centrifugal force on the rotor sections and special fabrication of the radial magnet sections (and brackets if used) of the rotor and the intervening mechanical connectors that may be spring loaded to permit slight expansion circumferentially and a special construction of the rotor with the bearings on the axle to permit a slight extension radially. Such an arrangement can "stretch" the outer supporting ring of the rotor under centrifugal force to increase the air gap with the above tapered design. The outer supporting ring can have spring loaded telescoping sections between the magnet supports, that allow this increase in diameter under centrifugal force. The magnets (with radial support brackets if used) may be connected rigidly at the outer periphery but slidably at the inner end to a ring support that may be attached to a bearing that support the magnet assembly particularly with regard to axial movement.

Yet another approach for changing the airgap is to utilize the torque generated in the machine to stretch elements of the rotor. For example if the sectors of the rotor are constructed as radial sections (for example for each pole section separated physically) and supported pivotally at the center and the external periphery by two annular rings or other support (the inner supports must allow some movement as well: such as with an elongated slotted pivot), such that when the sections are perfectly radial there is a larger gap between the radial elements (not the working airgap between the rotor and stator). A twisting of the inner annular ring about its axis, forces the "radial" magnet sections to move at a slight angle to the radial but increases the radial distance at each point on the magnet from the axis by moving the slotted pivots slightly in their respective slots. Under low load and no-load conditions the sectors of magnets are designed to be at a small angle to the radial direction thereby increasing the working airgap as a result of the tapered construction of the rotor and stators. However, under high load conditions the torque generated by the motor will drive the magnet sectors to a perfectly radial position thereby reducing the working airgap and increasing the power delivered by the machine and the torque generated against the load. The mounting arrangement will of course have to be spring mounted to resist these changes at low torque but allow this distortion at high torque. There should also be an end stop device to prevent the rotor sections from moving past the radial position to incline from the radial in the opposite direction to the no-load position under extreme load and thereby reducing the ability of the machine to provide adequate torque as a result of the increase of the working air gap.

Yet another embodiment can use differential expansion of the rotor with regard to the stator to increase the airgap at higher temperatures with the tapered design in the present invention. Each of the magnet structures that are positioned radially are connected together circumferentially and to the hub in the center by materials that have a high coefficient of expansion with heat in addition to their required load bearing properties required in this application. As the temperature of the machine rises the expansion on the rotor of the connecting elements between the magnets and the connecting elements to the hub(s) is designed to exceed that of the expansion of the stator and as result of the tapered construction will cause an increase in the gap of the machine.

Yet another embodiment of this invention has a magnet rotor attached to the axle with the stator attached to the housing and comprising windings with a higher coefficient of expansion than the magnet assemblies, thereby increasing the air gap with the tapered rotor/stator arrangement.

Yet another embodiment utilizes the fact that the magnets need to be supported to resist a tangential torque and an outward radial centrifugal force while in operation. As the rotor is supported in these embodiments by the motor body structure, the magnets in sectors may be fixed on the outer circumferential edge and radial air gaps (between radial sectors of magnets) permitted between adjoining magnets with only minimal support with spacers or minimal brackets to support the magnets to equalize torque between the magnets and reduce vibration. These radial airgaps contribute to the cooling of the magnets—a particularly important factor in axial gap machines. The cooling can be further improved by inclining the magnet faces between the magnets to be at a small angle to the axial direction so that the gaps scoop air from one side of the rotor and deposit it at the other side of the rotor. The Air return path could be at the periphery of the motor where cooling devices may be harnessed to lower the temperature of the air. The Air that is forced through the motor may be retuned to the other side of the motor after cooling in tubes on the periphery of the motor or inducted on one side of the motor and discharged on the other side of the motor. The latter arrangement will benefit more from a low ambient temperature but suffer from the disadvantage of impurities in the air that may damage or impair the motor operation. Some embodiments for such cooling follow in the present invention. Notably the stator windings in adjoining sections along the axis will need to be skewed to ensure that the faces of the magnet line up with the rotor windings on both sides for the rotor (in the event of stator windings being present on both sides for the rotor magnet). Still other embodiments have the radial sections of the magnets subdivided into smaller radial sections and interspersed with insulation thin film and pinned together to form each of the magnets that comprise the set of magnets around the perimeter of the rotor. This construction will reduce the Hall effect heating and power loss in the magnet assemblies.

Yet another feature of this invention is the use of a number of oscillators that are each phase lagged to one another, the set of said oscillators together forming a complete 360 degree electrical phase shift and may be driven off a controller (for example a hall effect controller) that identifies the position of the rotor for synchronizing the set of oscillators. These oscillators are connected to each of the phases of the motor (or generator) The power angle, and frequency are controllable with large capacitors (ultra capacitors may be used in this application) thereby permitting control of power delivered or extracted in regenerative mode of the motor. This arrangement of the sequence of oscillators provide a mechanism for energy storage, deployment and retrieval in the sort term particularly useful in vehicle drive applications. The oscillators can be designed to deliver sinusoidal waveforms or even what may approach square wave forms to maximize the torque generation of each phase. The background art has extensive material related to the use of controllers and sensors for control of moving magnet rotor motors, in the design of phase lagged systems of oscillators and power control of electrical machines by changing the power angle and frequency control of electrical oscillators. Notably the torque generation of the motor may accelerate the motor that in turn will require a higher frequency of oscillator output. To continue torque generation.

Yet another embodiment has separate load bearing axial bearings for the wheel from the bearings of the motor, while the wheel and motor are coupled to convey torque along the periphery of the motor, thereby minimizing the radial compression of the motor due to loads that the vehicle bears and which are transmitted through the wheel bearings. This will improve the performance of the tapered design for the motor elements as noted above by minimizing the change in axial gap with physical loads on the vehicle and its wheels.

Special arrangements need to be made in this and other architectures if there is a load supporting function for the present invention as in the use in a wheel structure for a vehicle. Load bearing functions as in wheels particularly on uneven surfaces, will cause relative compression of the rotor relative to the stator in the region below the machine, if there is a rigid connection between the wheel and the motor. Furthermore the unsprung mass of the wheel can be substantial if the motor is rigidly connected to the wheel. An alternative architecture in the present invention will be to have the load bearing bearings of the wheel separate to those of the motor itself and the motor shell attached flexibly to the wheel periphery to transfer torque. This may be done with tangential leaf springs that around the periphery mounted at one end to the wheel and at the other end to the motor housing on its periphery and thereby indirectly attached to the rotor. In this arrangement for forward motion the leaf springs will be in tension. These leaf springs may be designed to accommodate a compressive load for reverse motion of ht e vehicle. Alternatively, a second set of leaf springs may be used to be in tension when the vehicle is reversing and in compression in the forward direction. This second set of leaf springs may also be mounted at one end to have limited sliding capability so that when the vehicle is moving forward, these springs are not in compression but slide at the end coupling, but slide back to accept the tensile load when the vehicle is in reverse. This limited sliding arrangement may also be done for the first set of leaf springs to avoid compression when the vehicle is in reverse.

Another approach for the torque conversion in this architecture is to have key and slot arrangements along the periphery between the wheel and the motor. Compression of the wheel at any point on its periphery can be accommodated by the key sliding further into the slot. Torque will be transferred by the keys. The arrangement may have the slots on the wheel and the keys on the motor housing or with the slots on the motor and the keys on the wheel.

This new architectural feature may be taken further to have internal shock absorption for the wheel with flexible elements between the wheel bearing and the wheel periphery, thereby protecting the motor from excessive shock in this application as a wheel motor and reducing further the unsprung mass of the wheel. For example heavy leaf springs can be mounted tangentially between the periphery of the wheel and the central part of the wheel that is connected to the bearing, these leaf springs will accommodate some deflection of the wheel periphery relative to the bearing. In some embodiments of such internal shock absorption for wheels magnetic bearings may be employed.

Another aspect of the present invention is that cooling of the machine can be achieved with one or more of the following means:

1. In applications where the motor operates in dusty conditions or in water, the motor may be cooled with air pumped through an axial hole in the axle of the motor through ports in the stator between the rotor sections and forced out of the ports in the rotor. He pressure difference can be designed to ensure that there is no water or dust entering the motor.
2. In less severe conditions the motor casing can have fins very much like brake fins ion car wheels that scoop air into the motor through ports in the outer rotor disks each of the rotors and the stator disks inside the machine.
3. Yet another approach is to use bi-metallic conductor strips in each of the loops of ribbons that are proposed in the windings such that a part of the loop is of one metal and the remaining part of that loop is of the other metal, thereby forcing a cool junction at the periphery of the motor. The hot end can be designed to the axle which can be designed to be a heat sink to conduct heat to outside the motor. This arrangement can be combined with that described earlier with the rotor magnets with the inclined radial air gaps between the sector magnets, scooping air from the axial gap on one side of the rotor and depositing it on the other side and forcing a pressure differential that drives the air over the periphery of the stator which is cooled using the cold junction. The air may be returned along sealed paths or inducted and discharged to the atmosphere on the sides of the motor. If inducted and discharged into the atmosphere it will benefit additionally from the lower ambient air temperature. The hot junction will be at the axis, and the axle may be designed to be a heat sink to conduct heat out of the motor. In these embodiments that use the bimetallic stators for cooling there will of course be a direct current superimposed on the reversing currents (if required) to provide the cooling effect. The bimetallic winding arrangement may also be constructed to have the cold junctions and hot junctions in different locations, but such arrangements need to have heat sink arrangements near the hot junctions and locate the cold junctions where the magnets are cooled directly by convection through the air gap or cooled by an air flow that is forced around the cold junction. For example some embodiments may have the cold junction at the axis of the stator and fins at the periphery of the rotor to cool the outer edge of the airgap where the hot junction is located. Air can be forced through ports in the rotor bearings if such bearings are located between the stator sections.

By using the foregoing techniques, an electric machine can be fabricated with improved efficiency and results in an electric machine having improved operating characteristics.

Considering that in an application of the present invention in a vehicle wheel, ease of removal of the wheel and he motor are key benefits, the present invention proposes a central attachment along the non rotating axle for attachment with a central bolt that secures the wheel to the axle. The fit of the axle with the wheel socket for this purpose, may be tapered to allow the tension in the bolt to increase the reaction force between the socket and the axle surface. Moreover, to transfer torque the socket and the axle contact surfaces may be splined or keyed.

Furthermore this possible assembly aspect of the present invention may be further refined to have the wheel in two sections—the iner section that is on one side of the motor on the axle and outer section that is on the other side of the motor on the axle. Removal of the wheel without removal of the motor may be facilitated by removal of the external section only with the tire. The two sections of the wheel may be held together under operating conditions by bolts or other fasteners or simply key into each other when the rim and tire with the external section are installed to the axle. This keying arrangement may also be between the wheel rim attachments and the inner section.

PREFERRED EMBODIMENT

The following is a detailed description of some of the components of the preferred embodiment of the present invention.

The axial gap machine in the preferred embodiment has a plurality of disk-like magnet assemblies that constitute the rotor of the machine, that are installed to the outer body of the machine. The outer body in turn completes the magnetic circuit for the magnet assemblies, which provide the means for air gaps with axial magnetic fields. Moreover, one or more of these rotor magnet assembly disks may be supported with bearings on the axis to which the stator is fixed resulting in the assembled rotor resting on the central axle on a plurality of bearings that are mounted at the radially inner edge of two or more of the said magnet assemblies that interleave the stator disks. Such an arrangement may be constructed from separate disk assemblies of magnets as in rotors of axial field machines—well disclosed in the background art, that are attached together leaving adequate space between them for the required axial air gaps and a stator in each intervening space between adjoining rotor magnet assemblies.

The stator is composed of one or more disks that are each composed of windings that are fixed to the central axis of the machine. Each of these disks are interspersed with the rotor disks as described above. The said axis also provides the support for a wheel in a vehicle or gear or pulley arrangements in machines.

According to another feature of the invention, coils for an electric machine may be fabricated by conventional windings and cores or the following means.

Windings are composed of elements constructed in sectors of a torroid or annular ring that interlock as follows: Each of the conductors are shaped to form a loop with open ends at the inner circumferential edge of the torroidal or annular shape that is described. The cross section of the conductor is of a ribbon with width much greater than the thickness to minimize the Hall effect on the conductors. Magnetic core material of small cross section and in elements of length equal to the width of the ribbon may be attached to the conduction ribbon on one or both sides with insulating film. The conducting ribbon is of course insulated. The ribbon shaped conductor may be formed in many ways. One of the approaches are as follows: The ribbon shaped conductor is formed into a loop first without twisting the ribbon (0 degrees twist). The loop is further formed by straightening two diametrically opposed edges to form the two radial sections at a predetermined angle to each other that define the sector of the torroid or annular ring about the axis of the machine that a single loop of the winding will cover. However, one of these two radial sections of ribbon are twisted by 180 degrees about an axis along its length, and maintains this angular orientation along its entire length of that radial section. This results in the corresponding wide surface of the ribbon on both radial sections facing the same direction. This twist in the ribbon results in the twist being entirely generated through 180 degrees at the circumferential sections of the loop. Finally the two radial sections are placed so that they are radii of adjoining cylinders about the same axis. Stated another way, the circles of rotation of the two radial sections of the ribbon, develop two cylinders that are co axial and adjoining each other but do not intersect each other. This construction of the loop allows a series of such loops to interlock with each other to form a complete torroid or annular ring without any gaps. Moreover, if the magnetic material is bonded to the ribbon this will form a distributed core as well. With this construction of interlocking ribbons, the cross section of the torroid or annular ring has two ribbon shaped conductors edge to edge one each from the loops on either side of the torroid or annular ring. Each of the independent loops have terminals or simply flanges at each end of the ribbon loop positioned preferably on the inner circumferential section. Such flanges may be connected in series or parallel to each of the phases of the power circuits, to meet the particular winding need. Such connections may be made with pins that connect selected flanges. Notably, such a winding can be universal except for the sector angle that is described by the loops, in that die individual loops can be connected to any number of phases and turns per winding. A further improvement would be to use conductors of widening cross section on the radial sections to maximize the conductor crossection in each loop. The ribbon may alternatively be twisted by 360 degrees from end to end of the loop (instead of a net 0 degrees) by twisting each of the circumferential sections by 180 degrees in the same direction (rather than in opposite directions for the 0 degrees net). In either of these arrangements, the optimal utilization of the stator winding volume is achieved by adjusting the thickness of the conductors in relation to the thickness of the ferromagnetic material to maximize the flux linkage to the rotor by lowering the reluctance with more ferromagnetic core material while maximizing the conductor thickness and the current density. The conductor ribbons may be stranded and or braided wire to be more flexible in this arrangement. In some embodiments the entire back shaped as an annular flat disk between the two sections of conductors provides additional rigidity to the windings but is not physically connected to the axle. The entire load is transferred through the material of the windings to the axle. The back iron may be radially serrated to accommodate the edges of the windings and bonded together by methods well disclosed in the background art. Moreover, if the stator windings are predefined at the time of assembly and the physical angle of each phase winding is known in advance, the back iron may have raised sections that index the windings between these sections of the ribbon windings to transfer torque during operation. In addition the ribbon conductors may be shaped to index the sides of the back iron disk. In other embodiments several groups of adjacent radial sections of the ribbon windings are selected in symmetric positions around the stator, and each of the radial ribbon sections in these groups are fabricated to have broader cross sections in the radial (or working) sections of the ribbons thereby creating a set of splines—one for each group, that face the back iron, and that may interlock with splines in the back iron to transfer torque.

The above winding arrangements utilize the entire space in the torroid or annular ring with either conductors or magnetic core material. Furthermore it is possible to "grind" the windings or ribbons along with the distributed core to have any desired cross section for the stator thereby optimizing the airgap that may follow a non-linear rotor cross section as in some special rotor configurations noted in this invention.

This embodiment has rotor disks with magnets that are tapered to be narrower at the center and broader and the periphery where they are attached to the body of the rotating shell, and wherein the stator disks are tapered to be broader at the base at the axis and narrower towards the edge of the disks. Thereby the geometry will ensure that of the taper rates are the same for stator and the rotor, the airgap will remain the same radially across the machine for all the disks. Moreover, as the greatest torsional forces on the stator are near the axis and the greatest torsional forces on the rotor are near the periphery, this geometry can optimize material usage to minimize weight of the machine for the required strength characteristics.

An additional feature of the present invention with the above tapered rotor design can be utilized to optimize the air gap for different speeds for operation. A small air gap is desired in the machine at low speeds to maximize the torque generated by the machine. However as the machine builds speed, both back EMF and air resistance in the air gap will limit the speed of the machine significantly. The tapered design in the present invention can be adapted to automatically increase the air gap at high speed. This can be a smooth gradual process that matches the gap for the speed of performance. This is achieved by moving the sections of the rotor radially outwards by a very small amount. Notably, by having different gradients of taper of the sides of the rotor radially, the rate of change of the airgap can be different for different radial distances from the axis. For example, as the relative linear velocity between the stator and the rotor at the periphery of the motor rises more rapidly as the motor accelerates, a greater increase in air gap could be beneficial at the periphery. This can be achieved by having a steeper taper at the periphery of the motor (rotor and stator) and a more gradual taper towards the center of the motor. The exact tapers can be designed using computer simulations of the effect of back EMF and turbulent flow in the airgap. This movement may be achieved with centrifugal force on the rotor sections and special fabrication of the radial magnet sections (and brackets if used) of the rotor and the intervening mechanical connectors that may be spring loaded to permit slight expansion circumferentially and a special construction of the rotor with the bearings on the axle to permit a slight extension radially. Such an arrangement can "stretch" the outer supporting ring of the rotor under centrifugal force to increase the air gap with the above tapered design. The outer supporting ring can have spring loaded telescoping sections between the magnet supports, that allow this increase in diameter under centrifugal force. The magnets (with radial support brackets if used) may be connected rigidly at the outer periphery but slidably at the inner end to a ring support that may be attached to a bearing that support the magnet assembly particularly with regard to axial movement.

Yet another approach for changing the airgap is to utilize the torque generated in the machine to stretch elements of the rotor. For example if the sectors of the rotor are constructed as radial sections (for example for each pole section separated physically) and supported pivotally at the center and the external periphery by two annular rings or other support (the inner supports must allow some movement as well: such as with an elongated slotted pivot), such that when the sections are perfectly radial there is a larger gap between the radial elements (not the working airgap between the rotor and stator). A twisting of the inner annular ring about its axis, forces the "radial" magnet sections to move at a slight angle to the radial but increases the radial distance at each point on the magnet from the axis by moving the slotted pivots slightly in their respective slots. Under low load and no-load conditions the sectors of magnets are designed to be at a small angle to the radial direction thereby increasing the working airgap as a result of the tapered construction of the rotor and stators. However, under high load conditions the torque generated by the motor will drive the magnet sectors to a perfectly radial position thereby reducing the working airgap and increasing the power delivered by the machine and the torque generated against the load. The mounting arrangement will of course have to be spring mounted to resist these changes at low torque but allow this distortion at high torque. There should also be an end stop device to prevent the rotor sections from moving past the radial position to incline from the radial in the opposite direction to the no-load position under extreme load and thereby reducing the ability of the machine to provide adequate torque as a result of the increase of the working air gap.

Another feature of this embodiment utilizes the fact that the magnets need to be supported to resist a tangential torque and a outward radial centrifugal force while in operation. As the rotor is supported in these embodiments by the motor body structure, the magnets in sectors may be fixed on the outer circumferential edge and radial air gaps (between radial sectors of magnets as distinct from the required axial air gap for operation) permitted between adjoining magnets with only minimal support with spacers or minimal brackets to support the magnets to equalize torque between the magnets and reduce vibration. These radial airgaps contribute to the cooling of the magnets—a particularly important factor in axial gap machines. The cooling can be further improved by inclining the magnet faces between the magnets to be at a small angle to the axial direction so that the gaps scoop air from one side of the rotor and deposit it at the other side of the rotor. The Air return path could be at the periphery of the motor where cooling devices may be harnessed to lower the temperature of the air. The Air that is forced through the motor may be retuned to the other side of the motor after cooling in tubes on the periphery of the motor or inducted on one side of the motor and discharged on the other side of the motor. The latter arrangement will benefit more from a low ambient temperature but suffer from the disadvantage of impurities in the air that may damage or impair the motor operation. Some embodiments for such cooling follow in the present invention. Notably the stator windings in adjoining sections along the axis will need to be skewed to ensure that the faces of the magnet line up with the rotor windings on both sides for the rotor (in the event of stator windings being present on both sides for the rotor magnet). Still other embodiments have the radial sections of the magnets subdivided into smaller radial sections and interspersed with insulation thin film and pinned together to form each of the magnets that comprise the set of magnets around the perimeter of the rotor. This construction will reduce the Hall effect heating and power loss in the magnet assemblies.

Yet another feature of this invention is the use of a number of oscillators that are each phase lagged to one another, the set of said oscillators together forming a complete 360 degree phase shift and may be driven off a controller (for example a hall effect controller) that identifies the position of the rotor for synchronizing the set of oscillators. These oscillators are connected to each of the phases of the motor (or generator) The power angle, and frequency are controllable with large capacitors (ultra capacitors may be used in this application) thereby permitting control of power delivered or extracted in regenerative mode of the motor. This arrangement of the sequence of oscillators provide a mechanism for energy storage, deployment and retrieval in the short term particularly useful in vehicle drive applications.

The oscillators can be designed to deliver sinusoidal waveforms or even what may approach square wave forms to maximize the torque generation of each phase. The background art has extensive material related to the use of controllers and sensors for control of moving magnet rotor motors, in the design of phase lagged systems of oscillators and power control of electrical machines by changing the power angle and frequency control of electrical oscillators. Notably the torque generation of the motor may accelerate the motor that in turn will require a higher frequency of oscillator output. To continue torque generation.

Yet another feature of the present invention has separate load bearing axial bearings for the wheel from the bearings of the motor, while the wheel and motor are coupled to convey torque along the periphery of the motor, thereby minimizing the radial compression of the motor due to loads that the vehicle bears and which are transmitted through the wheel bearings. This will improve the performance of the tapered design for the motor elements as noted above by minimizing the change in axial gap with physical loads on the vehicle and its wheels.

Special arrangements need to be made in this and other architectures if there is a load supporting function for the present invention as in the use in a wheel structure for a vehicle. Load bearing functions as in wheels particularly on uneven surfaces, will cause relative compression of the rotor relative to the stator in the region below the machine, if there is a rigid connection between the wheel and the motor. Furthermore the unsprung mass of the wheel can be substantial if the motor is rigidly connected to the wheel. An alternative architecture proposed in the present invention will be to have the load bearing bearings of the wheel separate to those of the motor itself and the motor shell attached flexibly to the wheel periphery to transfer torque. This may be done with tangential leaf springs that around the periphery mounted at one end to the wheel and at the other end to the motor housing on its periphery and thereby indirectly attached to the rotor. In this arrangement for forward motion the leaf springs will be in tension. These leaf springs may be designed to accommodate a compressive load for reverse motion of ht e vehicle. Alternatively, a second set of leaf springs may be used to be in tension when the vehicle is reversing and in compression in the forward direction. This second set of leaf springs may also be mounted at one end to have limited sliding capability so that when the vehicle is moving forward, these springs are not in compression but slide at the end coupling, but slide back to accept the tensile load when the vehicle is in reverse. This limited sliding arrangement may also be done for the first set of leaf springs to avoid compression when the vehicle is in reverse.

Another approach for the torque conversion in this architecture is to have key and slot arrangements along the periphery between the wheel and the motor. Compression of the wheel at any point on its periphery can be accommodated by the key sliding further into the slot. Torque will be transferred by the keys. The arrangement may have the slots on the wheel and the keys on the motor housing or with the slots on the motor and the keys on the wheel.

This new architectural feature may be taken further to have internal shock absorption for the wheel with flexible elements between the wheel bearing and the wheel periphery, thereby protecting the motor from excessive shock in this application as a wheel motor and reducing further the unsprung mass of the wheel. For example heavy leaf springs can be mounted tangentially between the periphery of the wheel and the central part of the wheel that is connected to the bearing, these leaf springs will accommodate some deflection of the wheel periphery relative to the bearing. In some embodiments of such internal shock absorption for wheels magnetic bearings may be employed.

Another aspect of the present invention is that cooling of the machine can be achieved with one or more of the following means:

1. In applications where the motor operates in dusty conditions or in water, the motor may be cooled with air pumped through an axial hole in the axle of the motor through ports in the stator between the rotor sections and forced out of the ports in the rotor. He pressure difference can be designed to ensure that there is no water or dust entering the motor.
2. In less severe conditions the motor casing can have fins very much like brake fins ion car wheels that scoop air into the motor through ports in the outer rotor disks each of the rotors and the stator disks inside the machine.
3. Yet another approach is to use bi-metallic conductor strips in each of the loops of ribbons that are proposed in the windings such that a part of the loop is of one metal and the remaining part of that loop is of the other metal, thereby forcing a cool junction at the periphery of the motor. The hot end can be designed to the axle which can be designed to be a heat sink to conduct heat to outside the motor. Such heat dissipation at the axle may be improved with water or other coolant circulation through the axle using techniques well disclosed in the background art. This arrangement can be combined with that descriebed earlier with the rotor magnets with the inclined radial air gaps between the sector magnets, scooping air from the axial gap on one side of the rotor and depositing it on the other side and forcing a pressure differential that drives the air over the periphery of the stator which is cooled using the cold junction. The air may be returned along sealed paths or inducted and discharged to the atmosphere on the sides of the motor. If inducted and discharged into the atmosphere it will benefit additionally from the lower ambient air temperature. The hot junction will be at the axis, and the axle may be designed to be a heat sink to conduct heat out of the motor. In these embodiments that use the bimettalic stators for cooling there will of course be a direct current superimposed on the reversing currents (if required) to provide the cooling effect. The bimettalic winding arrangement may also be constructed to have the cold junctions and hot junctions in different locations, but such arrangements need to have heat sink arrangements near the hot junctions and locate the cold junctions where the magnets are cooled directly by convection through the air gap or cooled by an air flow that is forced around the cold junction. For example some embodiments may have the cold junction at the axis of the stator and fins at the periphery of the rotor to cool the outer edge of the airgap where the hot junction is located. Air can be forced through ports in the stator near the axle. And continue through the gaps between the magnet assembles to cool the magnets. Returns paths or induction and exhaust routes for the cooling air may be used as noted for the above designs. Gases other than air may be used to increate thermal capacity for heat removal from the magnet structure.

By using the foregoing techniques, an electric machine can be fabricated with improved efficiency and results in an electric machine having improved operating characteristics.

Considering that in an application of the present invention in a vehicle wheel, ease of removal of the wheel and the motor are key benefits, the present invention proposes a central attachment along the non rotating axle for attachment with a central bolt that secures the wheel to the axle. The fit of the axle with the wheel socket for this purpose, may be tapered to allow the tension in the bolt to increase the reaction force between the socket and the axle surface. Moreover, to transfer torque the socket and the axle contact surfaces may be splined or keyed.

Furthermore this possible assembly aspect of the present invention may be further refined to have the wheel in two sections—the inner section that is on one side of the motor on the axle and outer section that is on the other side of the motor on the axle. Removal of the wheel without removal of the motor may be facilitated by removal of the external section only with the tire. The two sections of the wheel may be held together under operating conditions by bolts or other fasteners or simply key into each other when the rim and tire with the external section are installed to the axle. This keying arrangement may also be between the wheel rim attachments and the inner section.

Figure 18:
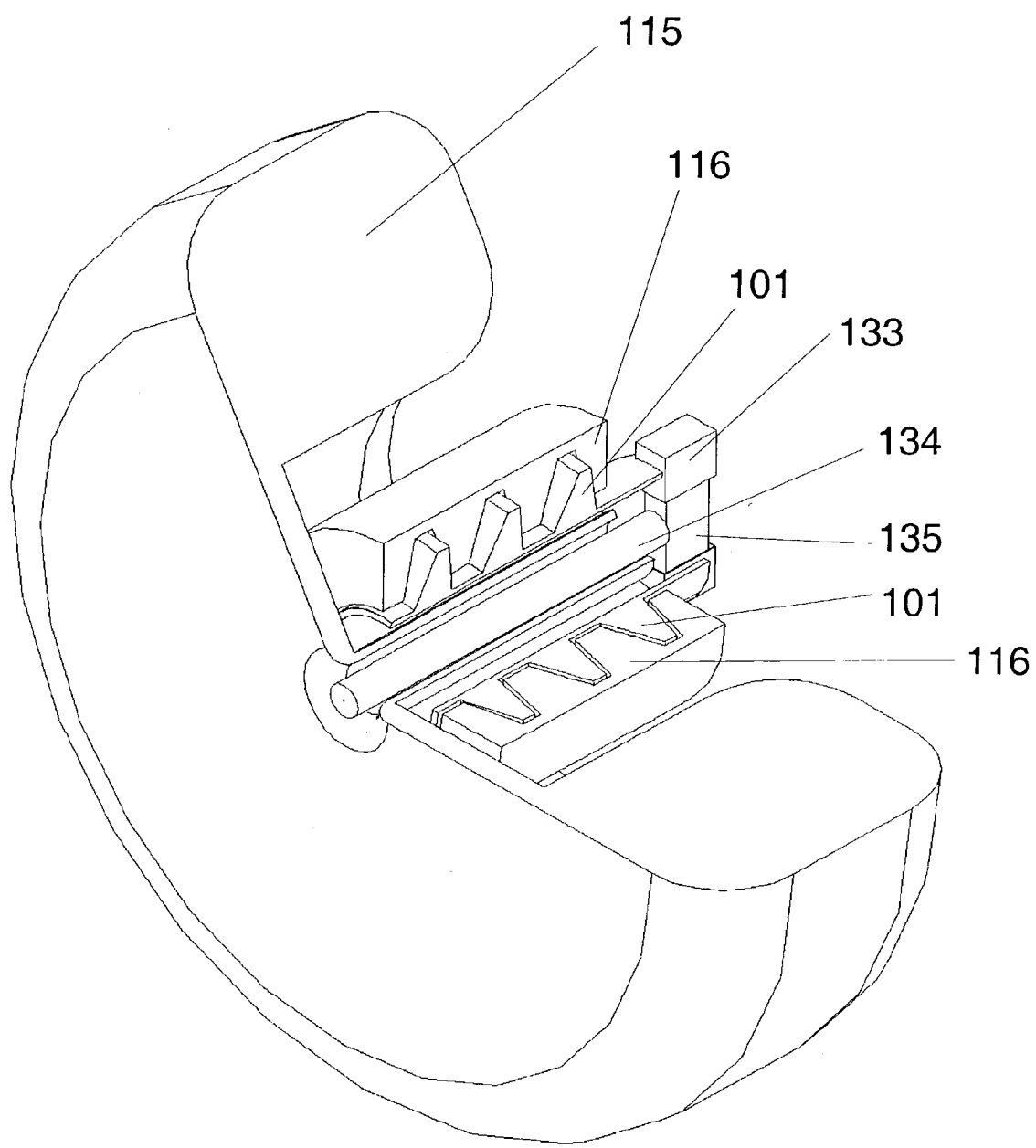
FIG. 18 and FIG. 19 illustrate an embodiment of the axial gap machine driving a wheel. The bearings for the wheel and the rotor, and the coupling flanges between the rotor and the wheel are not shown. Such coupling flanges may be spring loaded for extension under tension. The Figure illustrates the mass decoupling between the wheel and the rotor of the motor to reduce the unsprung effective mass of the wheel.
Figure 19:
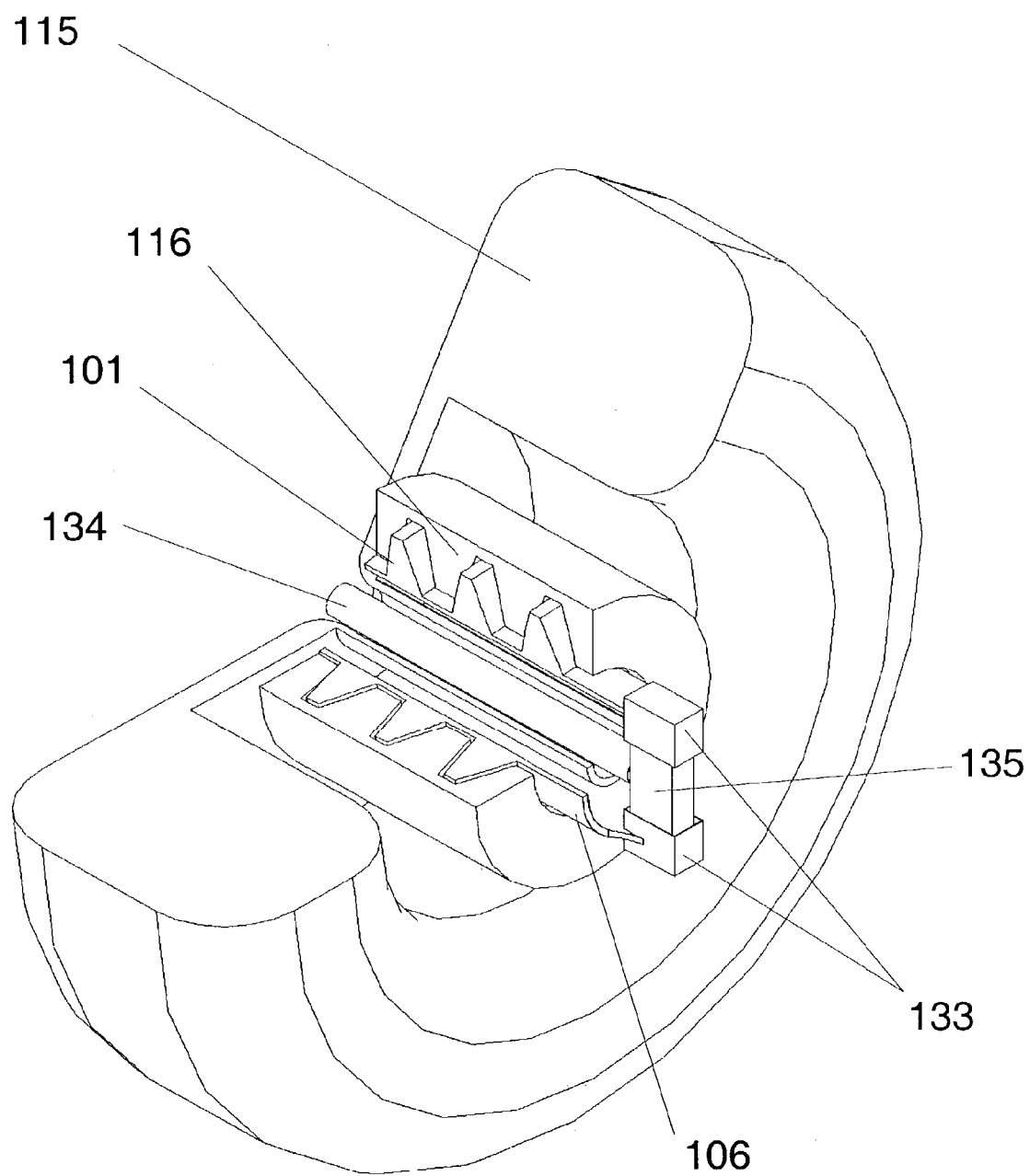

An embodiment of the present invention in a wheel is illustrated in FIGS. 18 and 19. Here the rotor is the motor housing and is coupled with the inside of the wheel using flexible flanges as described elsewhere in this invention. Such flanges may be spring loaded under tension. The weight of the wheel is supported by the axle that engages a bearing housing within the axle of the motor stator. There is in some embodiments a gap between the axle bearing housing (fixedly attached to the wheel) and the stator of the motor. This construction with the shock absorbing device between the wheel axle support 134 and the stator axle support 133, allows a decoupling of the wheel from the wheel motor. The torque is conveyed on the outer side of the motor or the rotor through the coupling flanges. There is a similar gap de signed between the motor rotor (motor housing) and the inside surface of the wheel to allow the controlled movement and decoupling in the event of radial accelerations of the wheel in a vertical direction. Overall this arrangement allows the wheel axle to move in a controlled fashion relative to the motor rotor in a direction perpendicular to the axes of the motor and the wheel suitable for shock absorption for the wheel with limited perturbation of the motor. Notably the larger the diameter of the outer surface of the rotor of the motor and the diameter of the inner surface of the wheel, the greater the effectiveness of the torque transmission flanges described, as a radial movement of the wheel relative to the motor axis will not incline the flanges significantly from their substantially tangential orientation to the inner surface of the wheel and the outer surface of the motor rotor. The wheel assembly including the motor support are supported in this embodiment by the stator mount and shock absorber housing 133 to the vehicle frame through the required shock absorbers and steering mechanisms. The stiffness and damping characteristics of the shock absorber supporting the entire wheel assembly and the stiffness and damping parameters of the wheel shock absorber will together determine the effective mass of the wheel. Support 135 is the support between wheel axle and shock absorber (either supporting the wheel axle or the shock absorber depending on the embodiment). In some embodiments the wheel axle may be directly supported 135 and then the motor is decoupled through the shock absorber 133. In other embodiments the Shock absorbers and motor stator are supported by the vehicle (through wheel assembly shock absorbers as noted above) and 135 supports the wheel axle and wheel through the shock absorber.

It is notable that the stiffness of the flanges or other torque coupling linkages disclosed herein will also support the motor to varying extents depending on their material properties and dimensions. Therefore the properties of the shock absorber 133 supporting the stator (and the motor through the motor bearings) will be interdependent with these support parameters. Varying support may be channeled to each of the elements with the other taking up the remaining weight. This implies that in the extreme the torque linkages may essentially support the motor through the rotor and the shock absorber provide essentially torque coupling to the vehicle support.

Figure 18A:
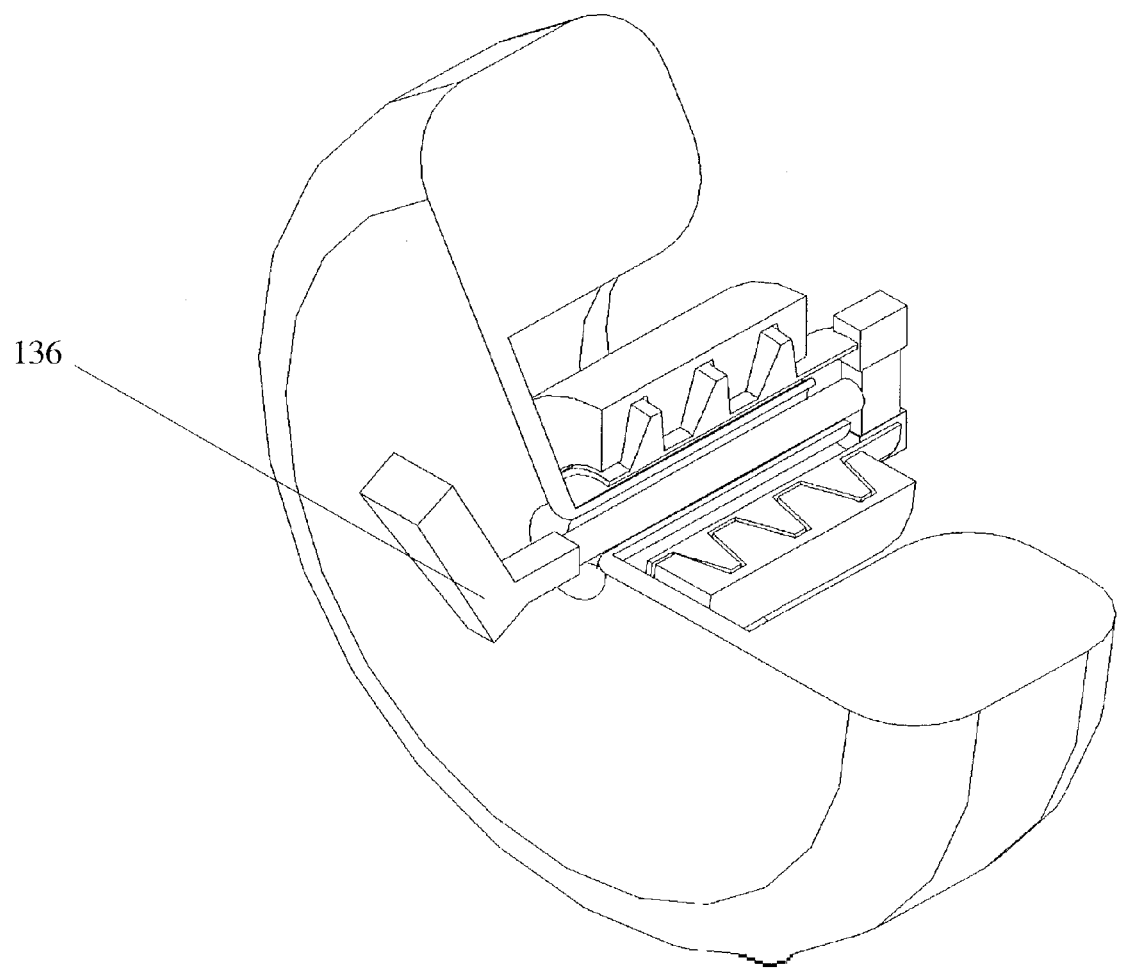
FIGS. 18A and 19A illustrate yet another embodiment of the wheel motor driving a wheel where the wheel support is directly on the axle and the wheel motor has a secondary shock absorber that is supported on the other side of the wheel axle.
Figure 19A:
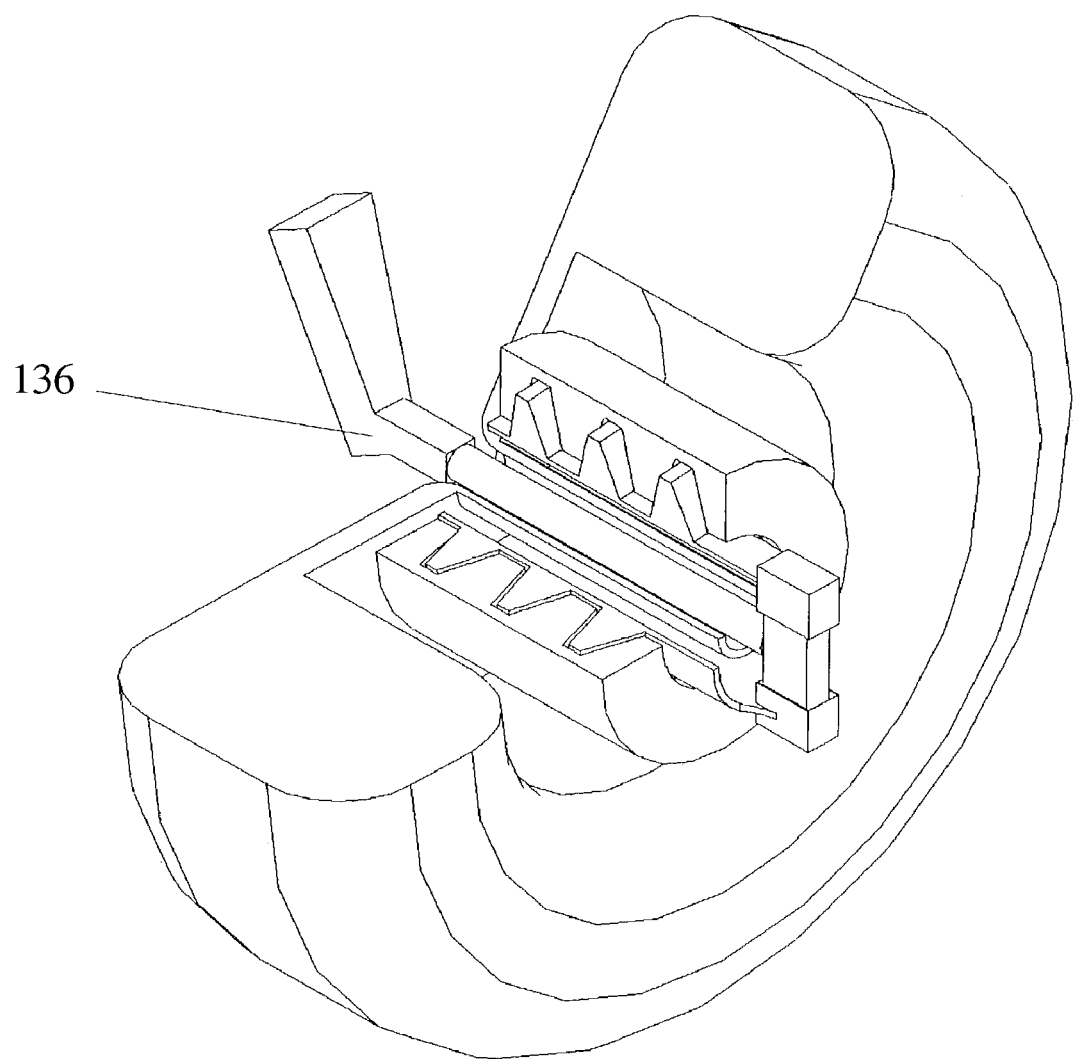
Figure 19B:
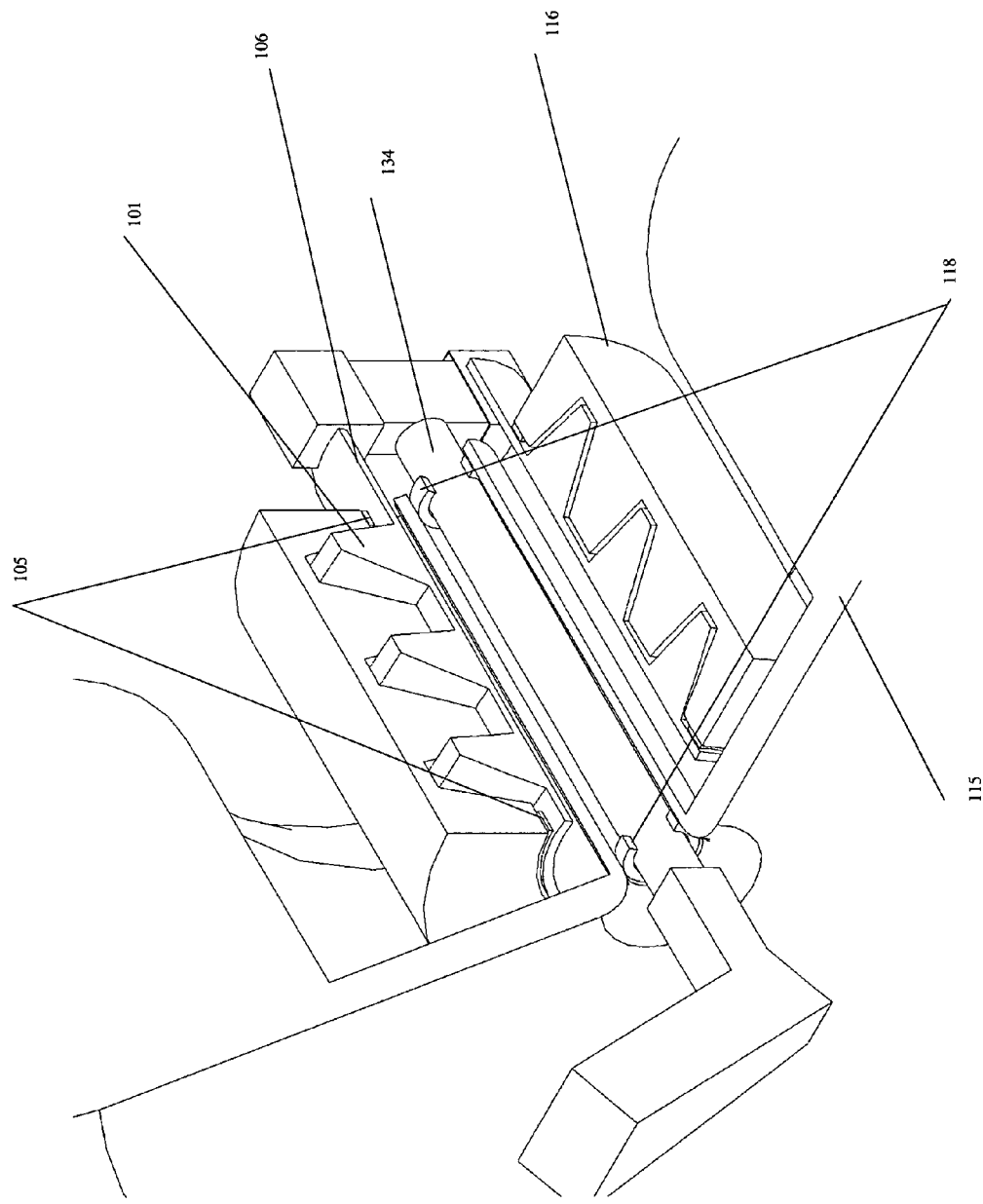
FIG. 19B shows the same embodiment as 19A with bearings shown as well.

Yet another variation of the embodiment of the motor driving a wheel is illustrated in FIGS. 18A and 19A. Here the wheel is directly supported on its axle with the appropriate shock absorption devices as amply disclosed in the background art. The motor is supported by the axle of the wheel with the shock absorbers 133, 135 now designed to absorb shock to the inertial mass of the motor and its supports relative to the wheel axle.

ALTERNATIVE EMBODIMENTS

In an alternative embodiment to the preferred embodiment, the stator winding construction uses stampings that form the entire circle of rotation of the motor. Apertures are stamped out for the magnetic core material that also forms support and each leg of the winding has configuration to provide the required flux generation to the core elements. The stampings are interleaved with thin insulating sheets, and may be displaced by a desired angle from the preceding stamping. To complete the winding design, pins may be inserted through the stack of stampings. Those stamping layers that need to be connected to each other will have a tight fit with two or more pins. Those that belong to another set of windings or phases have a loose fit to the pin in that location thereby not allowing electrical contact, but having other locations where the pins have a tight fit to form the required electrical contact. Notably the holes that match up with the pins may be stamped out as well and are designed to be narrow for the pins that need to be connected for the relevant stamping and wide for the pins that should not be connected to the relevant stamping. This design can be used for a wide variety of winding designs. Finally in these embodiments conductor thickness can be increased by utilizing space in the plane of stampings that do not have conductors in a particular winding radial section, by building up the adjoining stamping that does have a conductor in that particular winding section or radial section.

Another alternative embodiment of the windings using the torroidal structure with ribbon conductors can use braided or stranded material for the conductor. Yet another embodiment of the toroidal structure of the windings will have sheet metal stamped and bent into the required shape of each turn of the windings. These can be stamped to have flanges for connecting pins as well on the outer or inner periphery as well.

In yet other embodiments, the ribbon conductors may be either slotted on the inside circumferential sections or bent around (at the sections of the ribbon that is twisted at a point where the width is parallel to the radius) to accommodate radial support elements of the back iron linked to the axle, that may lie between the concentric cylinders formed by the windings as noted above.

Yet another embodiment will have the ribbon conductors packed with powder metal and compacted with dynamic magnetic compaction or other techniques available in the background art. This will improve the efficiency of utilization of space between conductors for a lower reluctance magnetic path. This is particularly useful if a constant thickness conductor is used and there is a greater gap between adjoining conductors towards the outer end of the working conductors. Yet another feature of this invention is an embodiment that has the radial sections of each ribbon conductor preformed and attached to a (insulating) membrane bag of the same shape as a side of each of the radial sections of the conductor, containing powder metal in a predetermined quantity. At the time of assembly of the coil, the powder metal will be redistributed in the thin membrane bags to take up all the available space between the conductors—more towards the outer ends of the radii. The assembly may then be compacted as noted above. Following the assembly of the windings as follows, the surface of the winding with the attached core material may be ground or machined to expose the surface of the ribbon conductor from the surrounding core material so that a magnetic gap is established to minimize magnetic leakage in the machine.

Several alternative embodiments of this invention are possible with the windings in the current invention using topologically equivalent conductor shapes. For example individual ribbon loops may be constructed to have two flanges near the axial edge of the working conductors on each of the legs of the loop, so that in the winding position these flanges of adjoining loops form a ring around the axis of the machine that can be used for support and also heat dissipation if they engage fixed elements of the axle. Moreover, such flanged may be arranged to be of varying lengths such that when assembled as a winding they form a splined profile that will better transfer torque to the axle which may have support flanges appropriately splined. Another application in using topologically equivalent conductors to flat ribbon conductor loops is to fold the conductor at the non-working ends to reduce the edge length on one side and not the other so as to allow easier assembly of the loops in the stator torroid. Yet another topologically equivalent form is to have an "O" shaped flat ribbon conductor (that may be stamped out) with straight sides that correspond with the length of the working conductors of the loop and straight conductors of the length of the non-working peripheral and axial conductors respectively. The closest form needs to be cut and separated at a point on the inner non-working conductor section to connect with adjoining loops. Sections of the Non-working conductors can then be bent to be perpendicular to the working conductors to permit the loop and winding configuration of the twisted conductor torroid construction noted in this invention with one notable difference- The torroid generated by these open loops that form the windings may not have an axis perpendicular to the width of the conductor but be at an angle thereby compromising he eddy current loss characteristics and the airgap.

Yet another embodiment uses the torroidal coil arrangement as described but with the permanent magnet rotor fixed to the axle and the stator attached to the housing of the machine.

Yet another alternative embodiment of the windings in the torroidal structure above has wound coils shaped into rectangular sections (it will no longer be necessary to minimize the Hall effect of the conductors and therefore the thickness of the coils can be comparable to the width of the coil. Each of the coils would then interlock to form a torroid or annullar ring. Each radial limb of the coil may have magnetic material attached to it to form a distributed magnetic core.

Yet another embodiment can use differential expansion of the rotor with regard to the stator to increase the air gap at higher temperatures with the tapered design in the present invention. Each of the magnet structures that are positioned radially are connected together circumferentially and to the hub in the center by materials that have a high coefficient of expansion with heat in addition to their required load bearing properties required in this application. As the temperature of the machine rises the expansion on the rotor of the connecting elements between the magnets and the connecting elements to the hub(s) is designed to exceed that of the expansion of the stator and as result of the tapered construction will cause an increase in the gap of the machine.

Yet another embodiment has "radial" airgaps between the magnet structures in the magnet assembly of the rotor, constructed to have a slight angle to the radial direction and said gap having a small angle to the axial direction on each side facing a working airgap, threby providing a mechanism to scoop air out from the working airgaps and discharge the hot air though ports at the periphery of the machine. The airflow can also be reversed in a similar embodiment where air is scooped up through ports on the periphery of the machine and pumped out to the working air gap. Such air can be exhausted through ports in the axle or at the periphery of machine between the magnet assemblies.

Yet another embodiment of this invention has a magnet rotor attached to the axle with the stator attached to the housing and comprising windings with a higher coefficient of expansion than the magnet assemblies, thereby increasing the air gap with the tapered rotor/stator arrangement.

Another alternative embodiment has the rotor of a multirotor machine with interspersed stators, entirely supported by the housing of the motor and its bearings on the sides of the motor, and without bearings at the axle between stators for the rotors, thereby reducing cost and weight of the machine.

Yet another embodiment of the present invention has the stator on the outside with the windings and the rotor attached to the rotating axle. Said embodiment having the rotor and stator designed with a tapered construction as discussed elsewhere in this invention.

Another alternative embodiment of the wheel drive for the present invention uses a fluid or gel between the outer surface of the rotor and the inner surface of the wheel. Notably a radial movement of the wheel relative to the motor does not change the overall volume in the gap between the inner surface of the wheel and the outer surface of the motor rotor. Both the inner surface of the wheel and the outer surface of the motor may have vanes to propagate the fluid or gel within the gap. Such vanes will need to be short enough to ensure that radial movement of the wheel axis relative to the motor axis does not let the vanes touch the opposite surface within the gap between the outer surface of the motor and the inner surface of the wheel. Such a fluid or el may be retained using techniques available in the background art.

Yet another embodiment uses magnetic suspension of the wheel relative to the motor using pairs of magnets on each side of inter meshing vanes mounted on both the inside of the wheel and the outside of the rotor of the motor instead of the flanges disclosed above. These vanes therefore repel each other (because for the orientation of the magnet polarity). As a result the wheel and the rotor of the motor will attain an equilibrium without contact of the vanes. A small vertical displacement will be allowed without resistance to the vanes that are vertical and provide resistance among those that are horizontal, (those vanes at an angle will also provide resistance but lower resistance than the horizontal vanes) therefore providing a shock absorption mechanism.

Yet another embodiment has radial displacement sensors between the motor axis and the wheel axis (technologies well disclosed in the background art), to detect the displacement at very small time intervals to change the motor controls to adapt torque supplied by the motor to remain relatively constant despite the imposed rotational relative movement caused by the torque couplings in the motor. For example the linkages may tend to rotate the motor rotor with regard to the wheel when there is a radial displacement. This feedback mechanism may be even more effective if the sensors directly detect unevenness in the path ahead of the wheel to adapt the input to the motor to keep torque substantially the same at the time the radial displacement is estimated to happen.

CONCLUSIONS, RAMIFICATIONS & SCOPE

Thus it will become apparent that the present invention presented, provides a new paradigm for the design of electrical machines for the use in wheel motors and other applications where high torque and low mass are required. The present invention presents embodiments that make these applications achievable with a unique machine structure, fabrication techniques and thermal, electric and magnetic performance management.

The invention claimed is:

1. A motor with a stator and a rotor with a supporting bearing and an outer circumference and width and a wheel attached to a support axis with a bearing coupled for the transfer of torque, in a vehicle, wherein the wheel and the rotor each have a normal position and a displaced position attained at the time of radial loading of the wheel, and wherein the wheel and the rotor are coaxial in the normal position and substantially coaxial in the displaced position, and wherein said motor with a rotor is located substantially inside the cylinder described by a circumference and a width of said wheel, and a coupling for transfer of torque lies substantially in an annular space described by the outer circumference of the rotor of the motor and the inner circumference of the wheel and the width of the motor, such that radial loading on said wheel are transferred directly to said wheel bearings, but not directly to said motor.

2. A motor coupled to a wheel as in claim 1, wherein said coupling for the transfer of toque between the motor and the wheel comprises a plurality of substantially tangential flanges supported at one end by the rotor of said motor and at the other end by the wheel.

3. A motor coupled to a wheel as in claim 1, wherein said coupling for the transfer of torque between the motor and the wheel comprises two sets of radial vanes in a fluid, the first set connected to the rotor of said motor and the second set connected to the wheel, such that said sets of vanes interleave each other on relative rotation of said wheel with regard to said motor rotor, without physical contact with each other, whereby said vanes when in relative motion with each other transfer a torque to each other through said fluid.

4. A motor coupled to a wheel as in claim 1, further comprising a radial shock absorption device with a first end and a second end, wherein said first end is attached to the stator of said motor and the second end is attached to the support axis of said wheel.

5. A motor coupled to a wheel as in claim 4, wherein said first end of said shock absorption device is attached to elements of the vehicle.

6. A motor coupled to a wheel as in claim 4, wherein said second end of said shock absorption device is attached to elements of the vehicle.

7. A motor coupled to a wheel as in claim 1, wherein the radial displacement between the axis of the wheel relative to the axis of the motor causes a rotational motion of the rotor of the motor relative to the wheel, a feedback control that substantially maintains said coupled torque between said wheel and said motor despite the relative rotational motion between said motor rotor and said wheel.

8. A motor coupled to a wheel as in claim 1, wherein said coupling for the transfer of toque between the motor and the wheel comprises a plurality of splines on the outer casing of said wheel motor engaging a plurality of splines arranged around the inside of said wheel, such that when engaged said splines engage one of the lower side of the wheel or the upper side of said wheel, thereby ensuring that vertical upward impact forces on the wheel result in the pairs of splines engaging either deeper or shallower respectively.

9. A connection of a motor with an outer circumference and width, to a wheel with an inner circumference, comprising:

a support for said wheel and said motor on separate but substantially coaxial bearings substantially within the cylinder of rotation described by the circumference and width of said wheel;

a coupling of the rotor of said motor with said wheel with flexible linkages substantially tangential to the axis of rotation of the motor and the wheel and arranged to be at a radial distance of less than the radius of said wheel and to lie substantially in an annular space described by the outer circumference of the motor and the inner circumference of the wheel and the width of the motor;

thereby transferring torque between said wheel and said rotor while providing radial decoupling of said motor from said wheel.

10. A connection of a motor to a wheel as in claim 9, wherein said linkages each with two ends, have each end connected at one end to the wheel and the other end connected to the motor, such that both of said connections transfer axial tensile loads along said linkages.

11. A motor with a stator and a rotor with a supporting bearing and a wheel attached to a support axis with a bearing coupled for the transfer of torque, in a vehicle, wherein the wheel and the rotor each have a normal position and a displaced position attained at the time of radial loading of the wheel, and wherein the wheel and the rotor are coaxial in the normal position and substantially coaxial in the displaced position, and wherein said motor with a rotor is located substantially inside the cylinder described by a circumference and a width of said wheel such that radial loading on said wheel are transferred directly to said wheel bearings, but not to said bearings of said rotor of said motor, wherein said coupling for the transfer of torque between the motor and the wheel comprises a magnetic field between a plurality of a pair of surfaces, one element of said pair attached to the rotor of said motor and the other element of said pair attached to the wheel, such that said magnetic field repels said elements of each pair of said surfaces in a substantially tangential direction relative to the axis of said motor and said wheel.

12. A motor with a stator, and a rotor with a supporting bearing, and a wheel attached to a support axis with a bearing coupled to said rotor with a coupling for the transfer of torque, in a vehicle, wherein the wheel and the rotor each have a normal position and a displaced position attained at the time of radial loading of the wheel, and wherein the wheel and the rotor are coaxial in the normal position and substantially coaxial in the displaced position, said vehicle further comprising a radial shock absorbtion device with a first end and a second end, wherein said first end is attached to the stator of said motor and the second end is attached to the support axis of said wheel and wherein said coupling has a first end and a second end, for transfer of torque wherein said coupling engages the rotor at its first end and the wheel at its second end such that radial loading on said wheel are transferred directly to said wheel bearings, but not directly to the motor.

13. A motor coupled to a wheel as in claim 12, wherein said first end of said shock absorption device is attached to elements of the vehicle.

14. A motor coupled to a wheel as in claim 12, wherein said second end of said shock absorption device is attached to elements of the vehicle.

\* \* \* \* \*